United States Patent
Gotoh et al.

(10) Patent No.: US 9,150,787 B2
(45) Date of Patent: Oct. 6, 2015

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Gotoh, Tokyo (JP); Subaru Kawasaki, Chiba (JP); Norikatsu Hattori, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 121 days.

(21) Appl. No.: 13/741,340

(22) Filed: Jan. 14, 2013

(65) Prior Publication Data
US 2014/0010973 A1    Jan. 9, 2014

(30) Foreign Application Priority Data

Jul. 6, 2012    (JP) .................................. 2012-152199
Dec. 6, 2012   (JP) .................................. 2012-267340

(51) Int. Cl.
C09K 19/00    (2006.01)
C09K 19/34    (2006.01)
C09K 19/12    (2006.01)
C09K 19/30    (2006.01)
C09K 19/38    (2006.01)
C09K 19/04    (2006.01)

(52) U.S. Cl.
CPC ............. *C09K 19/3402* (2013.01); *C09K 19/12* (2013.01); *C09K 19/3001* (2013.01); *C09K 19/3852* (2013.01); *C09K 2019/0448* (2013.01); *C09K 2019/122* (2013.01); *C09K 2019/123* (2013.01); *C09K 2019/301* (2013.01); *C09K 2019/3009* (2013.01); *C09K 2019/3016* (2013.01); *C09K 2019/3425* (2013.01); *Y10T 428/1005* (2015.01)

(58) Field of Classification Search
CPC ............. C09K 19/12; C09K 19/3001; C09K 19/3402; C09K 19/3852; C09K 2019/121; C09K 2019/122; C09K 2019/123; C09K 2019/3009; C09K 2019/301; C09K 2019/3016; C09K 2019/3425; Y10T 428/10; Y10T 428/1005
USPC ............. 428/1.1, 1.2, 1.3; 349/182–184, 186, 349/191, 190, 56, 88, 92, 94; 252/299.01, 252/299.61, 299.62, 299.64–299.68
See application file for complete search history.

(56) References Cited

U.S. PATENT DOCUMENTS

| | | | |
|---|---|---|---|
| 2004/0011996 A1* | 1/2004 | Klasen-Memmer et al. | 252/299.63 |
| 2010/0304049 A1* | 12/2010 | Bernatz et al. | 428/1.2 |
| 2014/0008572 A1* | 1/2014 | Gotoh et al. | 252/299.62 |

FOREIGN PATENT DOCUMENTS

| EP | 1889894 | 2/2008 |
|---|---|---|
| JP | 2003-307720 | 10/2003 |
| JP | 2003-327964 | 11/2003 |
| JP | 2004-131704 | 4/2004 |
| JP | 2006-133619 | 5/2006 |
| JP | 2009-155642 | 7/2009 |
| JP | 2010-285499 | 12/2010 |
| JP | 2010-537010 | 12/2010 |
| JP | 2010-537256 | 12/2010 |
| JP | 2012-007020 | 1/2012 |
| JP | 2012-082349 | 4/2012 |
| JP | 2012-121964 | 6/2012 |

OTHER PUBLICATIONS

Hoag et al, Macromolecules, V33, p. 8549-8558, Oct. 26, 2000.*
"International Search Report (Form PCT/ISA/210)", published on Jul. 2, 2013, p. 1-p. 3, in which the listed references (JP2010-285499, JP2012-082349, JP2009-155642, JP2003-327964, JP2012-121964 and JP2012-007020) were cited.
"International Search Report (Form PCT/ISA/210) of PCT counterpart application", mailed on Jul. 2, 2013, with English translation thereof, pp. 1-4.

* cited by examiner

*Primary Examiner* — Ruiyun Zhang
(74) *Attorney, Agent, or Firm* — Jianq Chyun IP Office

(57) ABSTRACT

A liquid crystal composition including a polymerizable compound, and an AM device including the liquid crystal composition are described. The liquid crystal composition includes the compound (1) and the compound (2):

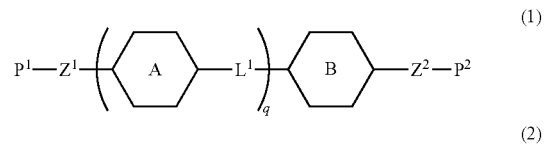

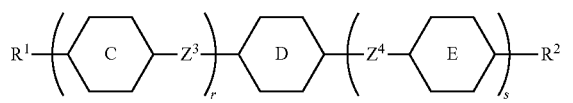

wherein $P^1$ and $P^2$ are polymerizable groups; the rings A, B, C and E are 1,4-cyclohexylene or 1,4-phenylene, etc.; the ring D is 2,3-difluoro-1,4-phenylene, etc.; $Z^1$ and $Z^2$ are alkylene, etc.; $L^1$, $Z^3$ and $Z^4$ are a single bond, etc.; $R^1$ and $R^2$ are alkyl, etc.; and q, r and s are 1, etc.

18 Claims, No Drawings

LIQUID CRYSTAL COMPOSITION AND LIQUID CRYSTAL DISPLAY DEVICE

CROSS-REFERENCE TO RELATED APPLICATIONS

This application claims the priority benefit of Japan Application No. 2012-152199, filed on Jul. 6, 2012 and Japan Patent Application No. 2012-267340, filed on Dec. 6, 2012. The entirety of each of the above-mentioned patent applications is hereby incorporated by reference herein and made a part of this specification.

TECHNICAL FIELD

The invention relates to a liquid crystal composition including a polymerizable compound that is polymerized by light or heat for instance. The invention also relates to a liquid crystal display device in which the liquid crystal composition is sealed between the substrates of the device, the polymerizable compound is polymerized while a voltage is applied to the device, and the orientation of liquid crystal molecules is adjusted by the effect of the resulting polymer.

The invention relates mainly to a liquid crystal composition suitable for use in an active matrix (AM) device and so on, and an AM device and so on that contain the composition. More specifically, the invention relates to a liquid crystal composition having negative dielectric anisotropy, and a device containing the composition and having an in-plane switching (IPS) mode, a fringe field switching (FFS) mode, a vertical alignment (VA) mode or a polymer sustained alignment (PSA) mode. The VA mode includes a multi-domain vertical alignment (MVA) mode and a patterned vertical alignment (PVA) mode.

TECHNICAL BACKGROUND

For liquid crystal display devices, the classification based on the operating mode for liquid crystal molecules includes modes such as phase change (PC), twisted nematic (TN), super twisted nematic (STN), electrically controlled birefringence (ECB), optically compensated bend (OCB), in-plane switching (IPS), fringe field switching (FFS), vertical alignment (VA) and polymer sustained alignment (PSA). The classification based on the driving mode of the device includes passive matrix (PM) and active matrix (AM) types. The PM type is further classified into static type, multiplex type and so on, and the AM type classified into thin film transistor (TFT) type, metal-insulator-metal (MIM) type and so on. The TFT type is further classified into amorphous silicon and polysilicon types, wherein the latter is classified into high-temperature type and low-temperature type according to the production process. The classification based on the light source includes the reflection type utilizing natural light, the transmission type utilizing a backlight, and the semi-transmission type utilizing both kinds of light.

These devices contain a liquid crystal composition having suitable characteristics. The liquid crystal composition has a nematic phase. The general characteristics of the composition should be improved to give an AM device having good general characteristics. Table 1 below summarizes the relationship between these two groups of general characteristics. The general characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase approximately is −10° C. or lower. The viscosity of the composition relates to the response time of the device. A short response time is desirable for displaying moving images on the device. Accordingly, a small viscosity of the composition is desirable. A small viscosity at a low temperature is more desirable.

TABLE 1

General Characteristics of Composition and AM Device

| No. | General Characteristics of Composition | General Characteristics of AM Device |
|---|---|---|
| 1 | wide temperature range of nematic phase | wide temperature range in which device can be used |
| 2 | small viscosity[1] | short response time |
| 3 | Suitable optical anisotropy | large contrast ratio |
| 4 | positively or negatively large dielectric anisotropy | low threshold voltage and small electric power consumption large contrast ratio |
| 5 | large specific resistance | large voltage holding ratio and large contrast ratio |
| 6 | high stability to ultraviolet light and heat | long service life |

[1] A liquid crystal composition can be injected into a liquid crystal display device in a shorter period of time The optical anisotropy of the composition relates to the contrast ratio of the device. The product ($\Delta n \times d$) of the optical anisotropy ($\Delta n$) of the composition and the cell gap (d) of the device is designed so as to maximize the contrast ratio. A suitable value of the product depends on the kind of operating mode. In a device having a VA mode or a PSA mode, a suitable value is in the range of approximately 0.30 micrometer to approximately 0.40 micrometer, and in a device having an IPS mode, a suitable value is in the range of approximately 0.20 micrometer to approximately 0.30 micrometer. In these cases, a composition having a large optical anisotropy is desirable for a device having a small cell gap. A large absolute value of the dielectric anisotropy in the composition contributes to a low threshold voltage, small electric power consumption and a large contrast ratio of the device. Accordingly, a large absolute value of the dielectric anisotropy is desirable. A large specific resistance of the composition contributes to a large voltage holding ratio and a large contrast ratio of the device. Accordingly, it is desirable that a composition should have a large specific resistance at room temperature and also at a high temperature in the initial stage. It is desirable that a composition should have a large specific resistance at room temperature and also at a high temperature after it has been used for a long time. The stability of the composition to ultraviolet light and heat relates to the service life of the liquid crystal display device. In the case where the stability is high, the device has a long service life. Such characteristics are desirable for an AM device used in a liquid crystal projector, a liquid crystal television and so forth.

A composition having positive dielectric anisotropy is used for an AM device having a TN mode. On the other hand, a composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device having a PSA mode. Regarding the AM device having a PSA mode, examples of a liquid crystal composition having negative dielectric anisotropy are disclosed in Patent Documents No. 1 to 6.

PRIOR ART

Patent Documents

Patent Document No. 1: JP 2003-307720 A.
Patent Document No. 2: JP 2004-131704 A.
Patent Document No. 3: JP 2006-133619 A.
Patent Document No. 4: EP 1,889,894 A.
Patent Document No. 5: JP 2010-537010 A.
Patent Document No. 6: JP 2010-537256 A.

A desirable AM device has characteristics such as a wide temperature range in which the device can be used, a short response time, a large contrast ratio, a low threshold voltage, a large voltage holding ratio and a long service life. Response time that is even one millisecond shorter than that of other devices is desirable. Thus, desirable characteristics of the composition include a high maximum temperature of a nematic phase, a low minimum temperature of a nematic phase, a small viscosity, a suitable optical anisotropy, a large positive or negative dielectric anisotropy, a large specific resistance, high stability to ultraviolet light and heat, etc.

In a liquid crystal display device having a PSA mode, a liquid crystal composition including a polymer is used. First, a small amount of a polymerizable compound is added to a liquid crystal composition, which is poured into a device. Next, the composition is irradiated with ultraviolet light while a voltage is applied between the substrates of the device. The polymerizable compound forms a network in the composition by the polymerization. Since the orientation of liquid crystal molecules can be adjusted by the polymer in this composition, the response time of the device is decreased and the image burn-in improved. Such effect of the polymer is expected for a device having a mode such as TN, ECB, OCB, IPS, FFS or VA.

A polymerizable compound having a rod-like molecular structure generally tends to have a great ability to orient liquid crystal molecules, but its solubility in a liquid crystal composition is not so high. Thus, a suitable combination of a polymerizable compound and a liquid crystal composition becomes important. The composition is required to have characteristics suitable for a liquid crystal display device. Thus, the response time of the device is decreased and the image burn-in is improved if a suitable combination of a polymerizable compound and liquid crystal compounds can be found.

SUMMARY OF THE INVENTION

The invention provides a liquid crystal composition that includes a polymerizable compound and is good in at least one of characteristics such as a high maximum temperature of a nematic phase, a low minimum temperature of a nematic phase, a small viscosity, a suitable optical anisotropy (a small optical anisotropy or a large optical anisotropy), a large negative dielectric anisotropy and a large specific resistance. The invention also provides a liquid crystal composition that is suitably balanced between at least two of the characteristics. The invention also provides a liquid crystal display device that contains such a composition. The invention also provides a composition that includes a polymer and has characteristics such as a small residual amount of the polymerizable compound, a large pretilt angle, a small viscosity, a suitable optical anisotropy, a large negative dielectric anisotropy, a high stability to ultraviolet light and a high stability to heat, and a AM device that has characteristics such as a small rate of screen burn-in, a short response time, a low threshold voltage, a large voltage holding ratio, a large contrast ratio and a long service life.

The liquid crystal composition of the invention includes at least one compound selected from the group of compounds represented by formula (1) as a first component and at least one compound selected from the group of compounds represented by formula (2) as a second component, and a liquid crystal display device containing the composition.

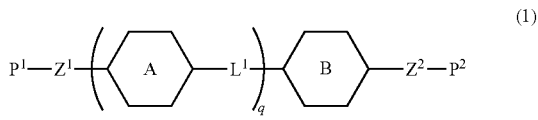

(1)

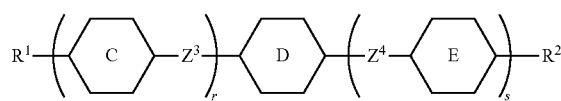

(2)

In formula (1), $P^1$ and $P^2$ are independently a group selected from groups represented by formula (P-1), formula (P-2) and formula (P-3):

(P-1)

(P-2)

(P-3)

wherein in formula (P-1), $M^1$ and $M^2$ are independently hydrogen, fluorine, methyl or trifluoromethyl, and in formula (P-3), $n^1$ is 1, 2, 3 or 4;

the ring A and the ring B are independently 1,4-cyclohexylene, 1,4-cyclohexenylene, 1,4-phenylene, naphthalene-1,4-diyl, naphthalene-1,5-diyl, naphthalene-2,6-diyl, tetrahydropyran-2,5-diyl, 1,3-dioxane-2,5-diyl, pyrimidine-2,5-diyl or pyridine-2,5-diyl, and in these groups at least one hydrogen may be replaced by halogen, alkyl having 1 to 12 carbons or alkyl having 1 to 12 carbons in which at least one hydrogen has been replaced by halogen;

$Z^1$ and $Z^2$ are independently alkylene having 1 to 10 carbons, and in the alkylene at least one —$CH_2$— may be replaced by —O—, —COO—, —COO— or —OCOO— and at least one —$CH_2$—$CH_2$— may be replaced by —CH=CH— or —C≡C—; and at least one of $Z^1$ and $Z^2$ has —O— when both $P^1$ and $P^2$ are a group represented by formula (P-2);

$L^1$ is independently a single bond, —COO— or —CH=CH—;

q is 0, 1, 2 or 3; and when q is 1 or 2 and all of the ring A and the ring B are 1,4-phenylene, at least one of $Z^1$ and $Z^2$ has —CH=CH— or —C≡C—.

In formula (2), $R^1$ and $R^2$ are independently alkyl having 1 to 12 carbons, alkoxy having 1 to 12 carbons or alkenyl having 2 to 12 carbons;

the ring C and the ring E are independently 1,4-cyclohexylene, tetrahydropyran-2,5-diyl, 1,4-phenylene, 2-fluoro-1,4-phenylene or 3-fluoro-1,4-phenylene;

the ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl;

$Z^3$ and $Z^4$ are independently a single bond, ethylene, methyleneoxy or carbonyloxy; and r is 1, 2 or 3, s is 0 or 1, and the sum of r and s is 3 or less.

EFFECT OF THE INVENTION

One of the merits of the invention is to provide a liquid crystal composition that includes a polymerizable compound and is good in at least one of characteristics such as a high maximum temperature of a nematic phase, a low minimum temperature of a nematic phase, a small viscosity, a suitable optical anisotropy (a small optical anisotropy or a large optical anisotropy), a large negative dielectric anisotropy and a large specific resistance. Another merit is to provide a liquid crystal composition that is suitably balanced between at least two of the characteristics. A further merit is to provide a liquid crystal display device that contains such a composition. An additional merit is to provide a composition that includes a polymer and has characteristics such as a small residual amount of the polymerizable compound, a large pretilt angle, a small viscosity, a suitable optical anisotropy, a large negative dielectric anisotropy, a high stability to ultraviolet light and a high stability to heat, and a AM device that has characteristics such as a small rate of screen burn-in, a short response time, a low threshold voltage, a large voltage holding ratio, a large contrast ratio and a long service life.

EMBODIMENTS OF THE INVENTION

Usage of the terms in this specification is described as follows. A liquid crystal composition and a liquid crystal display device may be abbreviated to "a composition" and "a device," respectively. "A liquid crystal display device" is a generic term for a liquid crystal display panel and a liquid crystal display module. A compound that is polymerizable may be abbreviated to "a polymerizable compound." "A liquid crystal compound" is a generic term for a compound having a liquid crystal phase such as a nematic phase or a smectic phase, and also for a compound having no liquid crystal phases but being useful as a component of a composition. Such a useful compound has a six-membered ring such as 1,4-cyclohexylene and 1,4-phenylene, and a rod-like molecular structure. At least one compound selected from the group of compounds represented by formula (1) may be abbreviated to "the compound (1)." "The compound (1)" means one compound, or two or more compounds represented by formula (1). The same rules apply to compounds represented by the other formulas. At least one group selected from the group of groups represented by formula (P-1) may be abbreviated to "the group (P-1)." The same rules apply to groups represented by other groups. The expression "at least one 'A' may be replaced by 'B'" means that the position of 'A' is arbitrary when the number of 'A' is one, and that the positions of 'A' can be selected without any restriction also when the number of 'A' is two or more.

The upper limit of the temperature range of a nematic phase may be abbreviated to "the maximum temperature." The lower limit of the temperature range of a nematic phase may be abbreviated to "the minimum temperature." That "specific resistance is large" means that a composition has a large specific resistance at room temperature and also at a temperature close to the maximum temperature of a nematic phase in the initial stage, and that the composition has a large specific resistance at room temperature and also at a temperature close to the maximum temperature of a nematic phase even after it has been used for a long time. That "a voltage holding ratio is large" means that a device has a large voltage holding ratio at room temperature and also at a temperature close to the maximum temperature of a nematic phase in the initial stage, and that the device has a large voltage holding ratio at room temperature and also at a temperature close to the maximum temperature of a nematic phase even after it has been used for a long time. When characteristics such as optical anisotropy are described, values that were obtained with the measuring methods described in the Examples will be used.

The first component means one compound, or two or more compounds. "The ratio of the first component" is expressed as the weight ratio (parts by weight) of the first component, when the weight of the liquid crystal composition excluding any polymerizable compound that is or is not the first component is defined as 100. "The ratio of the second component" is expressed as the percentage by weight (wt %) of the second component based on the weight of the liquid crystal composition excluding any polymerizable compound that is or is not the first component. "The ratio of the third component" is expressed in the same manner as "the ratio of the second component". The ratio of an additive mixed with the composition is expressed as the percentage by weight (wt %) or weight parts per million (ppm) based on the total weight of the liquid crystal composition. "The ratio of a polymerizable compound excluding the first component" is expressed as the weight ratio (parts by weight) of the polymerizable compound excluding the first component, when the weight of the liquid crystal composition excluding any polymerizable compound that is or is not the first component is defined as 100.

The symbol $R^1$ is used for a plurality of compounds in the chemical formulas of component compounds. Two groups represented by arbitrary two of $R^1$ may be the same or different in these compounds. In one case, for example, $R^1$ of the compound (2) is ethyl and $R^1$ of the compound (2-1) is ethyl. In another case, $R^1$ of the compound (2) is ethyl and $R^1$ of the compound (2-1) is propyl. The same rule applies to the symbols such as $R^2$, $Y^1$ and $Z^1$. Two rings C are present in one formula when r is 2 in formula (2). Two rings represented by two rings C may be the same or different in this compound. The same rule applies when r is greater than 2. The same rule applies to symbols such as $Z^3$ and the ring E.

2-Fluoro-1,4-phenylene means the following two divalent groups. Fluorine may be facing left or facing right in a chemical formula. The same rule applies to other asymmetric divalent groups such as tetrahydropyran-2,5-diyl.

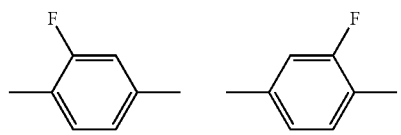

The inventors have found that a combination of the compound (1) and a liquid crystal composition is suitable for a device having a PSA mode because of the following reasons: a) the compound (1) has a high solubility in the liquid crystal composition, b) the compound (1) is easily polymerized to give a polymer, c) the residual amount of the compound (1) after the polymerization process is small, d) the polymer gives a large pretilt angle to liquid crystal molecules, e) The response time of the device is short, and f) the screen burn-in on the device is small, for instance.

The invention includes the following items.

1. A liquid crystal composition including at least one compound selected from the group of compounds represented by formula (1) as a first component and at least one compound selected from the group of compounds represented by formula (2) as a second component:

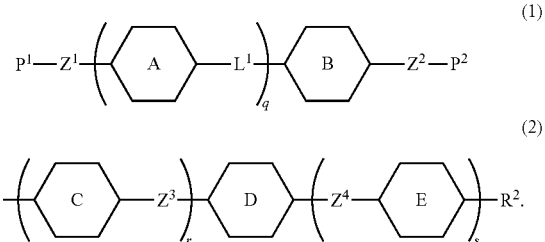

(1)

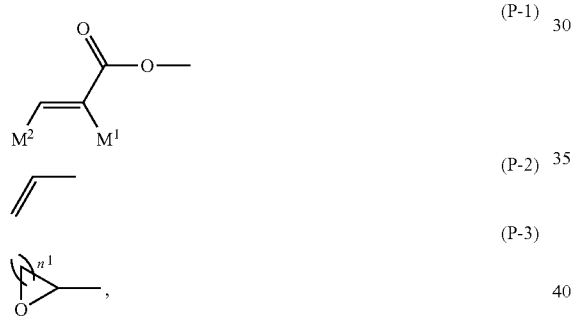

(2)

In formula (1), $P^1$ and $P^2$ are independently a group selected from groups represented by formula (P-1), formula (P-2) and formula (P-3):

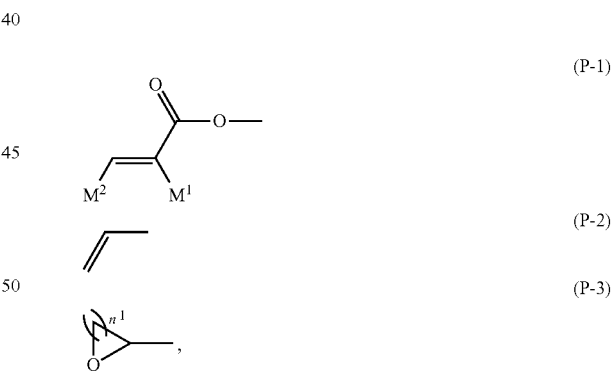

wherein in formula (P-1), $M^1$ and $M^2$ are independently hydrogen, fluorine, methyl or trifluoromethyl, and in formula (P-3), $n^1$ is 1, 2, 3 or 4;

the ring A and the ring B are independently 1,4-cyclohexylene, 1,4-cyclohexenylene, 1,4-phenylene, naphthalene-1,4-diyl, naphthalene-1,5-diyl, naphthalene-2,6-diyl, tetrahydropyran-2,5-diyl, 1,3-dioxane-2,5-diyl, pyrimidine-2,5-diyl or pyridine-2,5-diyl, and in these groups at least one hydrogen may be replaced by halogen, alkyl having 1 to 12 carbons or alkyl having 1 to 12 carbons in which at least one hydrogen has been replaced by halogen;

$Z^1$ and $Z^2$ are independently alkylene having 1 to 10 carbons, and in the alkylene at least one —CH$_2$— may be replaced by —O—, —COO—, —COO— or —OCOO— and at least one —CH$_2$—CH$_2$— may be replaced by —CH=CH— or —C≡C—; and at least one of $Z^1$ and $Z^2$ has —O— when both $P^1$ and $P^2$ are a group represented by formula (P-2);

$L^1$ is independently a single bond, —COO— or —CH=CH—;

q is 0, 1, 2 or 3; and when q is 1 or 2 and all of the ring A and the ring B are 1,4-phenylene, at least one of $Z^1$ and $Z^2$ has —CH=CH— or —C≡C—.

In formula (2), $R^1$ and $R^2$ are independently alkyl having 1 to 12 carbons, alkoxy having 1 to 12 carbons or alkenyl having 2 to 12 carbons;

the ring C and the ring E are independently 1,4-cyclohexylene, tetrahydropyran-2,5-diyl, 1,4-phenylene, 2-fluoro-1,4-phenylene or 3-fluoro-1,4-phenylene;

the ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl;

$Z^3$ and $Z^4$ are independently a single bond, ethylene, methyleneoxy or carbonyloxy; and r is 1, 2 or 3, s is 0 or 1, and the sum of r and s is 3 or less.

2. The liquid crystal composition according to item 1, including at least one compound selected from the group of compounds represented by formula (1-1) and formula (1-2) as the first component:

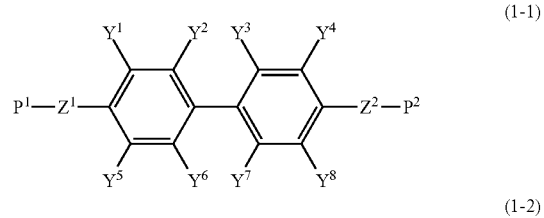

(1-1)

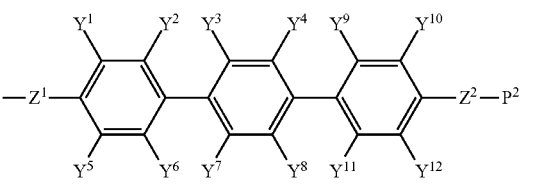

(1-2)

wherein $P^1$ and $P^2$ are independently a group selected from groups represented by formula (P-1), formula (P-2) or formula (P-3):

(P-1)

(P-2)

(P-3)

wherein in formula (P-1), $M^1$ and $M^2$ are independently hydrogen, fluorine, methyl or trifluoromethyl, and in formula (P-3), $n^1$ is 1, 2, 3 or 4;

$Z^1$ and $Z^2$ are independently alkylene having 1 to 10 carbons, and in the alkylene at least one —CH$_2$— may be replaced by —O—, —COO—, —COO— or —OCOO— and at least one —CH$_2$—CH$_2$— may be replaced by —CH=CH— or —C≡C—; and when at least one of $Z^1$ and $Z^2$ has —CH=CH— or —C≡C— and both $P^1$ and $P^2$ are a group represented by formula (P-2), at least one of $Z^1$ and $Z^2$ has —O—; and $Y^1$ to $Y^{12}$ are independently hydrogen, fluorine, methyl or trifluoromethyl.

3. The liquid crystal composition according to item 1 or 2, including at least one compound selected from the group of compounds represented by formulae (1), (1-1) and (1-2) in which both $Z^1$ and $Z^2$ have —CH═CH—, as the first component.

4. The liquid crystal composition according to any one of items 1 to 3, wherein the first component consists of at least two compounds.

5. The liquid crystal composition according to any one of items 1 to 4, further including at least one polymerizable compound excluding formula (1) according to item 1.

6. The liquid crystal composition according to any one of items 1 to 5, wherein the second component is at least one compound selected from the group of compounds represented by formulae (2-1) to (2-19):

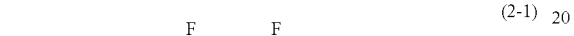
(2-1)

(2-2)

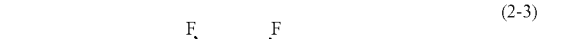
(2-3)

(2-4)

(2-5)

(2-6)

(2-7)

(2-8)

-continued

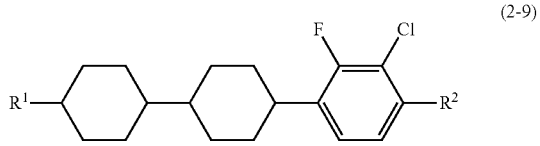
(2-9)

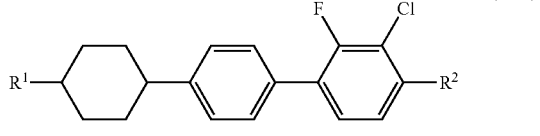
(2-10)

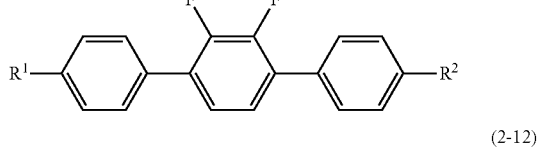
(2-11)

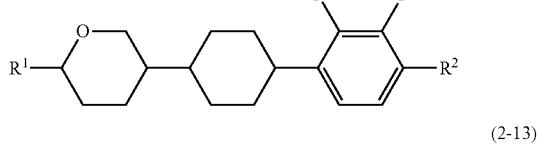
(2-12)

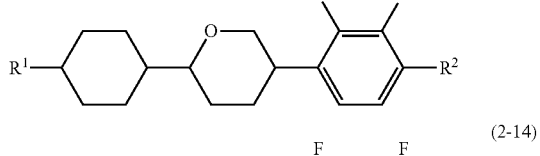
(2-13)

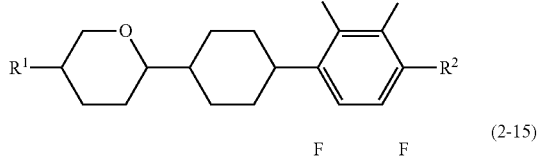
(2-14)

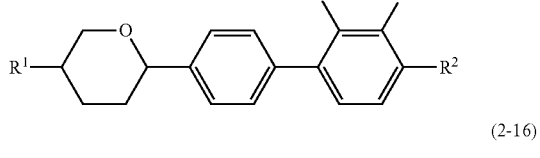
(2-15)

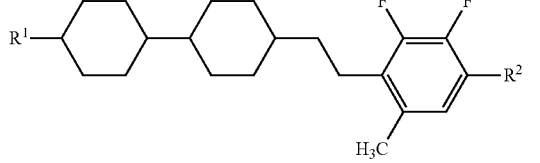
(2-16)

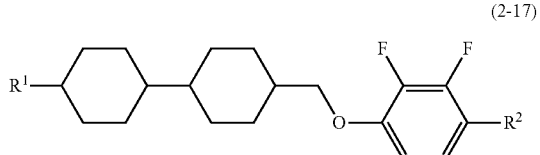
(2-17)

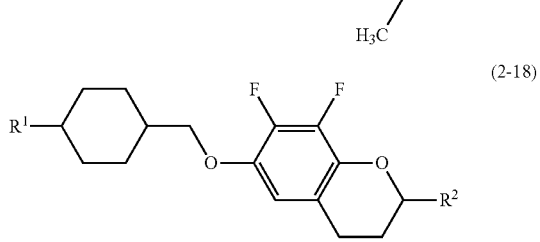
(2-18)

(2-19)

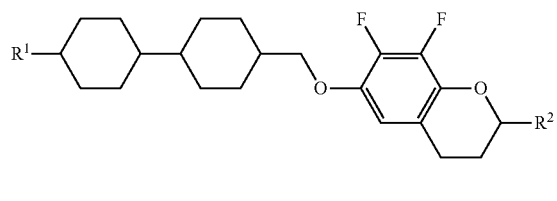

wherein $R^1$ and $R^2$ are independently alkyl having 1 to 12 carbons, alkoxy having 1 to 12 carbons or alkenyl having 2 to 12 carbons.

7. The liquid crystal composition according to any one of items 1 to 6, including at least one compound selected from the group of compounds represented by formula (2-3) according to item 6, as the second component.

8. The liquid crystal composition according to any one of items 1 to 7, including at least one compound selected from the group of compounds represented by formula (2-5) according to item 6, as the second component.

9. The liquid crystal composition according to any one of items 1 to 8, including at least one compound selected from the group of compounds represented by formula (2-7) according to item 6, as the second component.

10. The liquid crystal composition according to any one of items 1 to 9, including at least one compound selected from the group of compounds represented by formula (2-8) according to item 6, as the second component.

11. The liquid crystal composition according to any one of items 1 to 10, wherein the ratio of the second component is in the range of 10 wt % to 100 wt % based on the weight of the liquid crystal composition excluding any polymerizable compound that is or is not the first component, and the ratio of the polymerizable compound that is or is not the first component is in the range of 0.03 part by weight to 10 parts by weight based on 100 parts by weight of the liquid crystal composition excluding the polymerizable compound that is or is not the first component.

12. The liquid crystal composition according to any one of items 1 to 11, further including at least one compound selected from the group of compounds represented by formula (3) as a third component:

(3)

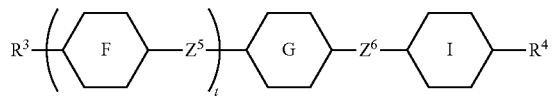

wherein $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine; the ring F, the ring G and the ring I are independently 1,4-cyclohexylene, 1,4-phenylene, 2-fluoro-1,4-phenylene or 3-fluoro-1,4-phenylene; $Z^5$ and $Z^6$ are independently a single bond, ethylene, methyleneoxy or carbonyloxy; and t is 0, 1 or 2.

13. The liquid crystal composition according to any one of items 1 to 12, including at least one compound selected from the group of compounds represented by formula (3-1) to formula (3-13), as the third component:

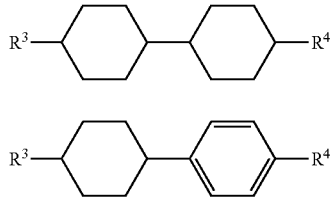
(3-1)

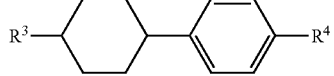
(3-2)

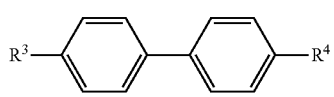
(3-3)

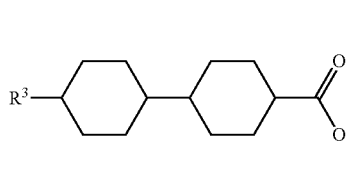
(3-4)

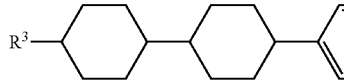
(3-5)

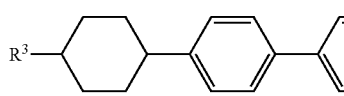
(3-6)

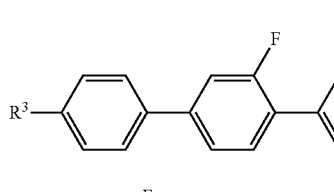
(3-7)

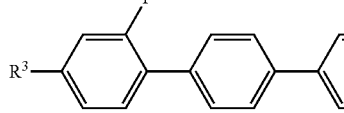
(3-8)

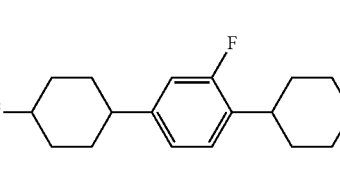
(3-9)

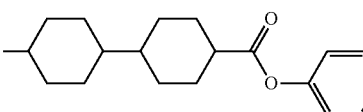
(3-10)

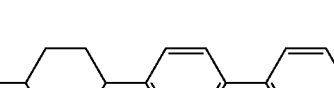
(3-11)

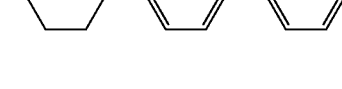
(3-12)

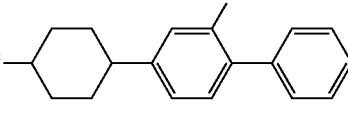

(3-13)

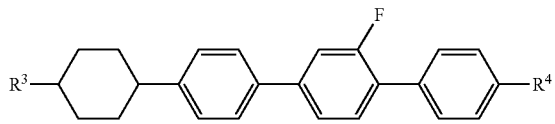

wherein $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine.

14. The liquid crystal composition according to any one of items 1 to 13, including at least one compound selected from the group of compounds represented by formula (3-1) according to item 12, as the third component.

15. The liquid crystal composition according to any one of items 1 to 14, including at least one compound selected from the group of compounds represented by formula (3-8) according to item 12, as the third component.

16. The liquid crystal composition according to any one of items 12 to 15, wherein the ratio of the second component is in the range of 10 wt % to 80 wt % and the ratio of the third component is in the range of 20 wt % to 90 wt % based on the weight of the liquid crystal composition excluding any polymerizable compound that is or is not the first component, and the ratio of the polymerizable compound that is or is not the first component is in the range of 0.03 part by weight to 10 parts by weight based on 100 parts by weight of the liquid crystal composition excluding the polymerizable compound that is or is not the first component.

17. The liquid crystal composition according to any one of items 1 to 16, further including a polymerization initiator.

18. The liquid crystal composition according to any one of items 1 to 17, further including a polymerization inhibitor.

19. The liquid crystal composition according to any one of items 1 to 18, wherein the maximum temperature of a nematic phase is 70° C. or higher, the optical anisotropy (25° C.) at the wavelength of 589 nanometers is 0.08 or more, and the dielectric anisotropy (25° C.) at the frequency of 1 kHz is −2 or less.

20. A polymer sustained alignment type (PSA) liquid crystal display device characterized by that the device is composed of two substrates where at least one of the substrates has an electrode layer and by that a liquid crystal material, which includes a polymer formed by polymerization of the polymerizable compound in the liquid crystal composition according to any one of items 1 to 19, is arranged between the two substrates.

21. The liquid crystal display device according to item 20, wherein the operating mode of the liquid crystal display device is a TN mode, a VA mode, an OCB mode, an IPS mode or an FFS mode, and the driving mode of the liquid crystal display device is an active matrix mode.

22. Method for producing a liquid crystal display device, wherein the liquid crystal display device according to item 20 is produced by steps comprising: light-irradiating the liquid crystal composition according to any one of items 1 to 19 arranged between the two substrates to polymerize the polymerizable compound, while a voltage is applied.

23. Use of the liquid crystal composition according to any one of items 1 to 19 in a liquid crystal display device.

The invention also includes the following items: 1) the composition described above, wherein the second component is a mixture of at least one compound selected from the group of compounds represented by formula (2-1) and at least one compound selected from the group of compounds represented by formula (2-7); 2) the composition described above, wherein the second component is a mixture of at least one compound selected from the group of compounds represented by formula (2-3) and at least one compound selected from the group of compounds represented by formula (2-7); 3) the composition described above, wherein the second component is a mixture of at least one compound selected from the group of compounds represented by formula (2-1), at least one compound selected from the group of compounds represented by formula (2-5) and at least one compound selected from the group of compounds represented by formula (2-8); 4) the composition described above, wherein the third component is a mixture of at least one compound selected from the group of compounds represented by formula (3-1) and at least one compound selected from the group of compounds represented by formula (3-3); and 5) the composition described above, wherein the third component is a mixture of at least one compound selected from the group of compounds represented by formula (3-1) and at least one compound selected from the group of compounds represented by formula (3-5).

The invention also includes the following items: 1) the composition described above, further including an optically active compound; 2) the composition described above, further including an additive, such as an antioxidant, an ultraviolet light absorber and/or an antifoaming agent; 3) an AM device containing the composition described above; 4) a device containing the composition described above and having a mode of TN, ECB, OCB, IPS, FFS, VA or PSA; 5) a transmission-type device containing the composition described above; 6) use of the composition described above, as a composition having a nematic phase; and 7) use of the composition prepared by adding an optically active compound to the composition described above, as an optically active composition.

The composition of the invention will be described in the following order. First, the constitution of component compounds in the composition will be described. Second, the main characteristics of the component compounds and the main effects of these compounds on the composition will be described. Third, combinations of components in the composition, desirable ratios of the components and the basis thereof will be described. Fourth, desirable embodiments of the component compounds will be described. Fifth, specific examples of the component compounds will be shown. Sixth, additives that may be mixed in the composition will be described. Seventh, methods for synthesizing the component compounds will be described. Last, the use of the composition will be described.

First, the constitution of component compounds in the composition will be described. The compositions of the invention are classified into the composition A and the composition B. The composition A may further include any other liquid crystal compound, an additive and an impurity, in addition to liquid crystal compounds selected from the compound (1), the compound (2) and the compound (3). "Any other liquid crystal compound" is a liquid crystal compound that is different from the compound (1), the compound (2) and the compound (3). Such a compound is mixed in the composition for the purpose of further adjusting the characteristics. Among other liquid crystal compounds, the cyano compound desirably has a smaller amount in view of its low stability to heat or ultraviolet light. The more desirable ratio of the cyano compound is 0 wt %. The additives include an optically active compound, an antioxidant, an ultraviolet light absorber, a coloring matter, an antifoaming agent and a polymerization initiator, etc. The impurity is compounds and so forth which have contaminated component compounds in a process such as their synthesis. Even in the case where the compound is liquid crystalline, it is classified into the impurity herein.

The composition B consists essentially of compounds selected from the group of the compounds (1), the compounds (2) and the compounds (3). The term "essentially" means that the composition may include an additive and an impurity, but does not include any liquid crystal compound that is different from those compounds. The composition B has a smaller number of components than the composition A. The composition B is preferable to the composition A in view of cost reduction. The composition A is preferable to the composition B in view of the fact that physical properties can be further adjusted by adding other liquid crystal compound(s).

Second, the main characteristics of the component compounds and the main effects of the compounds on the characteristics of the composition will be described. The main characteristics of the component compounds are summarized in Table 2 on the basis of the effects of the invention. In Table 2, the symbol L stands for "large" or "high", the symbol M stands for "medium", and the symbol S stands for "small" or "low". The symbols L, M and S are classified according to a qualitative comparison among the component compounds, and "0" (zero) means that the corresponding value is nearly zero.

TABLE 2

Characteristics of Compounds

| Compounds | Compound (2) | Compound (3) |
| --- | --- | --- |
| Maximum Temperature | S-L | S-L |
| Viscosity | M-L | S-M |
| Optical Anisotropy | M-L | S-L |
| Dielectric Anisotropy | M-L[1)] | 0 |
| Specific Resistance | L | L |

[1)]The value of optical anisotropy is negative, and the symbol expresses the magnitude of the absolute value.

The main effects of the component compounds on the characteristics of the composition upon mixing the component compounds with the composition are as follows. The compound (2) increases the absolute value of the dielectric anisotropy, and lowers the minimum temperature. The compound (3) decreases the viscosity, or raises the maximum temperature and lowers the minimum temperature.

Third, combinations of the components in the composition, the desirable ratio of each component and the basis thereof will be described. Combinations of the components in the composition include a combination of the first and second components, and a combination of the first, second and third components.

The desirable ratio of the first component is approximately 0.05 part by weight or more for orienting liquid crystal molecules, and approximately 10 parts by weight or less for preventing a poor display, based on 100 parts by weight of the liquid crystal composition excluding any polymerizable compound that is or is not the first component. The more desirable ratio is in the range of approximately 0.1 part by weight to approximately 2 parts by weight.

The desirable ratio of the second component is approximately 10 wt % or more for increasing the absolute value of the dielectric anisotropy and approximately 80 wt % or less for decreasing the minimum temperature, based on the liquid crystal composition excluding any polymerizable compound that is or is not the first component. The more desirable ratio is in the range of approximately 15 wt % to approximately 70 wt %. The especially desirable ratio is in the range of approximately 20 wt % to approximately 60 wt %.

The desirable ratio of the third component is approximately 20 wt % or more for decreasing the viscosity or raising the maximum temperature and approximately 90 wt % or less for increasing the absolute value of the dielectric anisotropy, based on the liquid crystal composition excluding any polymerizable compound that is or is not the first component. The more desirable ratio is in the range of approximately 30 wt % to approximately 80 wt %. The especially desirable ratio is in the range of approximately 50 wt % to approximately 75 wt %.

Fourth, desirable embodiments of the component compounds will be described. $R^1$ and $R^2$ are independently alkyl having 1 to 12 carbons, alkoxy having 1 to 12 carbons or alkenyl having 2 to 12 carbons. Desirable $R^1$ or $R^2$ is alkyl having 1 to 12 carbons for increasing the stability to ultraviolet light or heat and alkoxy having 1 to 12 carbons for decreasing the viscosity or increasing the absolute value of the dielectric anisotropy.

$R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine. Desirable $R^3$ or $R^4$ is alkenyl having 2 to 12 carbons for decreasing the viscosity, or is alkyl having 1 to 12 carbons for increasing the stability to ultraviolet light or heat.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. The desirable configuration of —CH═CH— in the alkenyl depends on the position of the double bond. The trans configuration is preferred for the alkenyl such as 1-propenyl, 1-butenyl, 1-pentenyl, 1-hexenyl, 3-pentenyl and 3-hexenyl for decreasing the viscosity, for instance. The cis configuration is preferred in the alkenyl such as 2-butenyl, 2-pentenyl and 2-hexenyl. In the alkenyl, straight-chain alkenyl is preferable to branched-chain alkenyl.

Desirable examples of alkenyl in which at least one hydrogen has been replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl, for decreasing the viscosity.

The scope of the alkyl does not include cyclic alkyl. The scope of the alkoxy does not include cyclic alkoxy. The scope of the alkenyl does not include cyclic alkenyl. With regard to the configuration of 1,4-cyclohexylene, trans is preferable to cis for raising the maximum temperature.

$P^1$ and $P^2$ are independently the group (P-1), the group (P-2) or the group (P-3).

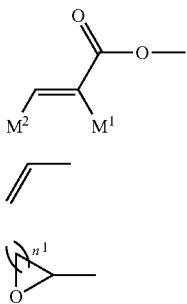

(P-1)

(P-2)

(P-3)

Desirable $P^1$ or $P^2$ is the group (P-1) or the group (P-2) for increasing the reactivity or decreasing the response time. More desirable $P^1$ or $P^2$ is the group (P-1).

$M^1$ and $M^2$ are independently hydrogen, fluorine, methyl or trifluoromethyl. Desirable $M^1$ or $M^2$ is hydrogen or methyl for increasing the reactivity. More desirable $M^1$ is methyl, and more desirable $M^2$ is hydrogen.

$n^1$ is 1, 2, 3 or 4. Desirable $n^1$ is 1 or 2 for increasing the reactivity. More desirable $n^1$ is 1.

The ring A and the ring B are independently 1,4-cyclohexylene, 1,4-cyclohexenylene, 1,4-phenylene, naphthalene-1,4-diyl, naphthalene-1,5-diyl, naphthalene-2,6-diyl, tetrahydropyran-2,5-diyl, 1,3-dioxane-2,5-diyl, pyrimidine-2,5-diyl or pyridine-2,5-diyl, and in these groups at least one hydrogen may be replaced by halogen, alkyl having 1 to 12 carbons or alkyl having 1 to 12 carbons in which at least one hydrogen has been replaced by halogen, and arbitrary two rings A may be the same or different when q is 2 or 3. Desirable ring A or ring B is 1,4-phenylene in which at least one hydrogen may be replaced by halogen, for increasing the reactivity.

The ring C and the ring E are independently 1,4-cyclohexylene, tetrahydropyran-2,5-diyl, 1,4-phenylene, 2-fluoro-1,4-phenylene or 3-fluoro-1,4-phenylene, and arbitrary two rings C may be the same or different when r is 2 or 3. Desirable ring C or ring E is 1,4-cyclohexylene for decreasing the viscosity, or is 1,4-phenylene for increasing the optical anisotropy. Tetrahydropyran-2,5-diyl is

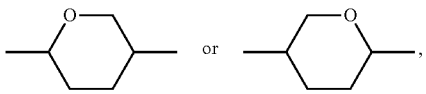

and preferably

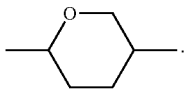

The ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Desirable ring D is 2,3-difluoro-1,4-phenylene for decreasing the viscosity, 2-chloro-3-fluoro-1,4-phenylene for decreasing the optical anisotropy, or 7,8-difluorochroman-2,6-diyl for increasing the absolute value of the dielectric anisotropy.

The ring F, the ring G and the ring I are independently 1,4-cyclohexylene, 1,4-phenylene, 2-fluoro-1,4-phenylene or 3-fluoro-1,4-phenylene, and two rings F may be the same or different when t is 2. Desirable ring F, ring G or ring I is 1,4-cyclohexylene for decreasing the viscosity or increasing the maximum temperature, or is 1,4-phenylene for decreasing the minimum temperature.

$Z^1$ and $Z^2$ are independently alkylene having 1 to 10 carbons, and in the alkylene at least one —$CH_2$— may be replaced by —O—, —COO—, —COO— or —OCOO— and at least one —$CH_2$—$CH_2$— may be replaced by —CH=CH— or —C≡C—; and at least one of $Z^1$ and $Z^2$ has —O— when both $P^1$ and $P^2$ have the group (P-2), and at least one of $Z^1$ and $Z^2$ has —CH=CH— or —C≡C— when q is 1 or 2 and all of the ring A and the ring B are 1,4-phenylene. Desirable $Z^1$ and $Z^2$ are simultaneously alkylene having —C≡C— or —CH=CH— for increasing the reactivity or decreasing the response time, or —$CH_2$— for increasing the pretilt angle. More desirable $Z^1$ or $Z^2$ is —CH=CH—, —CH=CH—O— or —$CH_2$O—, for increasing the solubility in the liquid crystal composition.

$Z^3$, $Z^4$, $Z^5$ and $Z^6$ are independently a single bond, ethylene, methyleneoxy or carbonyloxy, and arbitrary two of $Z^3$ may be the same or different when r is 2 or 3, and two of $Z^5$ may be the same or different when t is 2. Desirable $Z^3$, $Z^4$, $Z^5$ or $Z^6$ is a single bond for decreasing the viscosity, ethylene for decreasing the minimum temperature, or methyleneoxy for increasing the absolute value of the dielectric anisotropy.

$L^1$ is a single bond, —COO— or —CH=CH—, and arbitrary two of $L^1$ may be the same or different when q is 2 or 3. Desirable $L^1$ is a single bond.

$Y^1$ to $Y^{12}$ are independently hydrogen, fluorine, methyl or trifluoromethyl. Desirable $Y^1$ to $Y^{12}$ are hydrogen for increasing the reactivity, or are fluorine or trifluoromethyl for increasing the solubility in the liquid crystal composition.

q is 0, 1, 2 or 3. Desirable q is 1 or 2 for increasing the reactivity, or is 0 for increasing the solubility in the liquid crystal composition. r is 1, 2 or 3. Desirable r is 1 for decreasing the viscosity, or is 2 or 3 for increasing the maximum temperature. s is 0 or 1. Desirable s is 0 for decreasing the viscosity, or is 1 for decreasing the minimum temperature. t is 0, 1 or 2. Desirable t is 0 for decreasing the viscosity, or is 1 or 2 for increasing the maximum temperature.

Fifth, specific examples of the component compounds will be shown. In the desirable compounds described below, $R^5$ and $R^8$ are independently straight alkyl having 1 to 12 carbons, straight alkoxy having 1 to 12 carbons or straight alkenyl having 2 to 12 carbons. $R^6$ is straight alkyl having 1 to 12 carbons or straight alkoxy having 1 to 12 carbons. $R^7$ is straight alkyl having 1 to 12 carbons or straight alkenyl having 2 to 12 carbons. $Y^4$ and $Y^{10}$ are independently hydrogen or fluorine. $M^3$ and $M^4$ are independently hydrogen or methyl.

Desirable compounds (1) are the compounds (1-1-1) to (1-3-2). More desirable compounds (1) are the compounds (1-1-1), (1-2-1) and (1-3-1). Desirable compounds (2) are the compounds (2-1-1) to (2-19-1). More desirable compounds (2) are the compounds (2-1-1) to (2-10-1) and the compounds (2-12-1) to (2-15-1). Especially desirable compounds (2) are the compounds (2-1-1) to (2-8-1), (2-13-1) and (2-15-1). Desirable compounds (3) are the compounds (3-1-1) to (3-13-1). More desirable compounds (3) are the compounds (3-1-1) to (3-8-1), (3-10-1) and (3-13-1). Especially desirable compounds (3) are the compounds (3-1-1), (3-3-1), (3-5-1), (3-7-1) and (3-8-1).

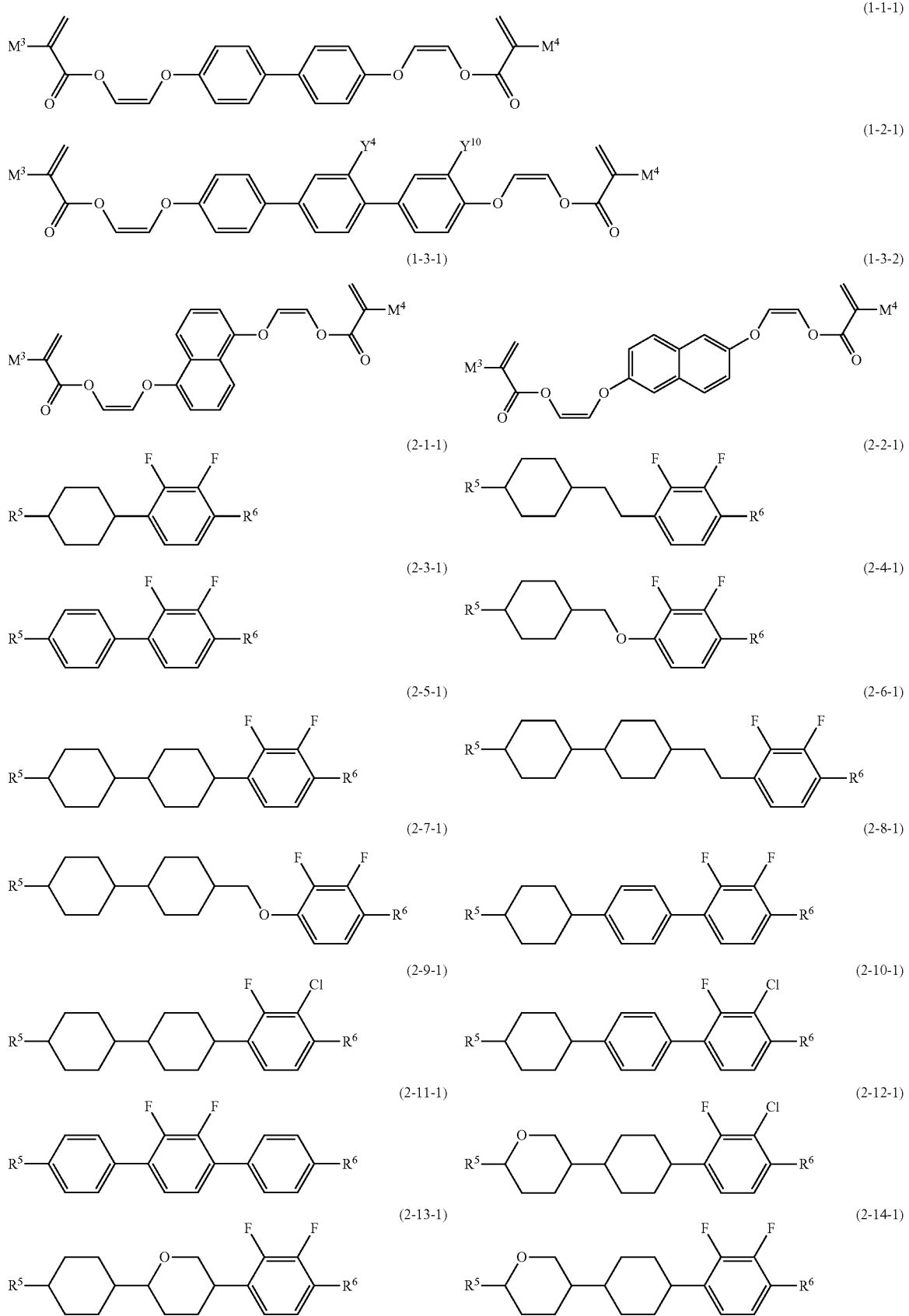

-continued (2-15-1)
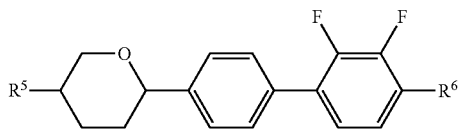

(2-16-1)
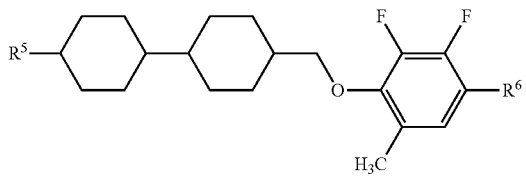

(2-17-1)
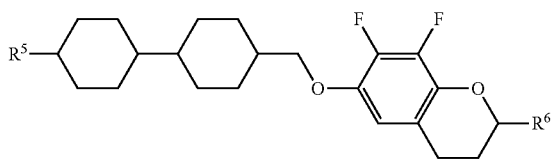

(2-18-1)
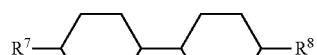

(2-19-1)
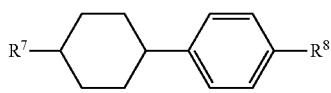

(3-1-1)
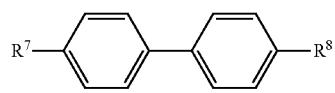

(3-2-1)
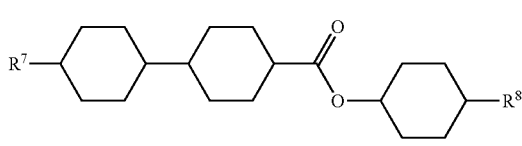

(3-3-1)
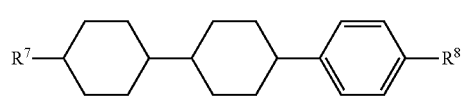

(3-4-1)

(3-5-1)
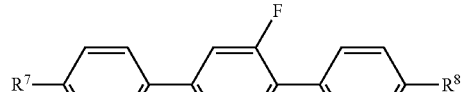

(3-6-1)
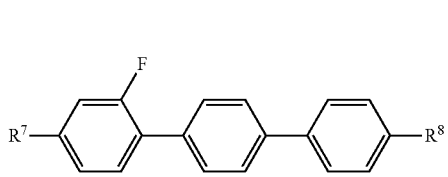

(3-7-1)
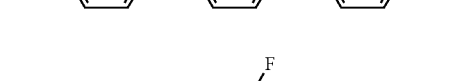

(3-8-1)
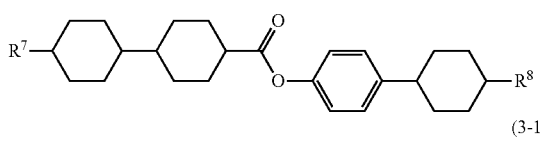

(3-9-1)
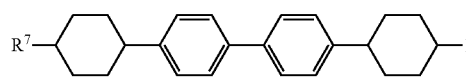

(3-10-1)
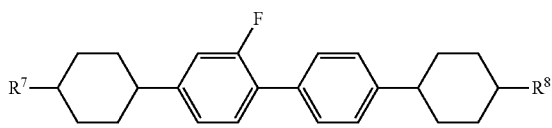

(3-11-1)
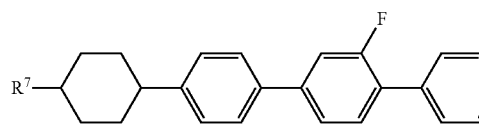

(3-12-1)

(3-13-1)

Sixth, additives which may be mixed in the composition will be described. Such additives include a polymerizable compound excluding the compound (1), a polymerization initiator, a polymerization inhibitor, an optically active compound, an antioxidant, an ultraviolet light absorber, a light stabilizer, a thermal stabilizer, an antifoaming agent and a coloring matter.

The composition of the invention is adapted to a device having a polymer sustained alignment (PSA) mode, since it includes a polymerizable compound. The composition may further include a polymerizable compound different from the compound (1) (referred to as "other polymerizable compound(s)"). Desirable examples of other polymerizable compounds are acrylates, methacrylates, vinyl compounds, vinyloxy compounds, propenyl ethers, epoxy compounds (oxiranes, oxetanes) and vinyl ketones. More desirable examples are acrylate derivatives and methacrylate derivatives.

Additional examples of polymerizable compounds excluding the compound (1) that may be further included are compounds (4-1) to (4-9).

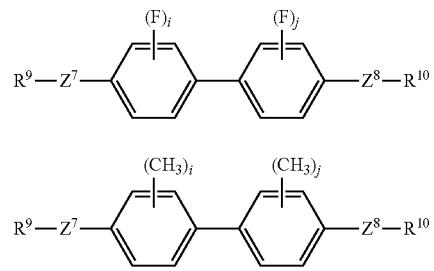

(4-1)

(4-2)

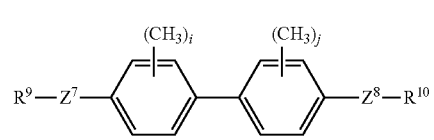

(4-3)

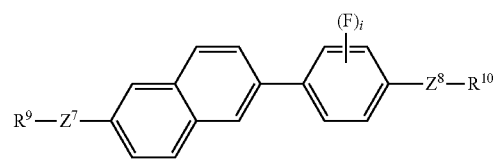

(4-4)

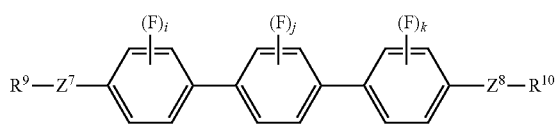

(4-5)

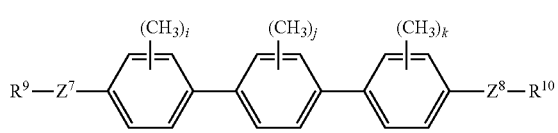

(4-6)

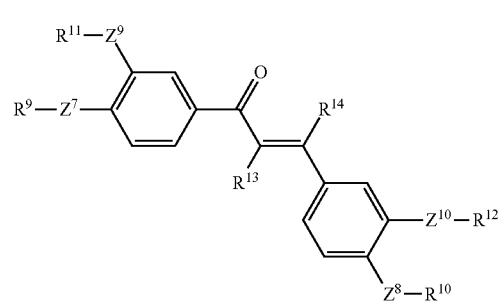

(4-7)

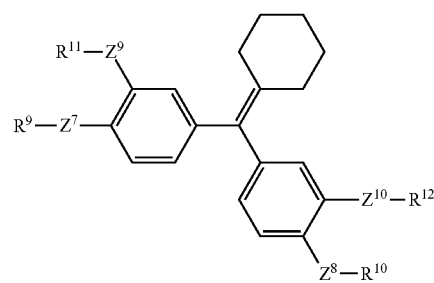

(4-8)

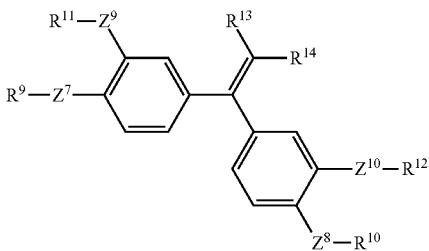

(4-9)

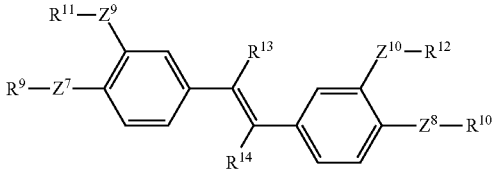

In the compound (4-1) to compound (4-9), $R^9$, $R^{10}$, $R^{11}$ and $R^{12}$ are independently acryloyl or methacryloyl, and $R^{13}$ and $R^{14}$ are independently hydrogen, halogen or alkyl having 1 to 10 carbons;

$Z^7$ and $Z^8$ are independently a single bond or alkylene having 1 to 12 carbons, and in the alkylene at least one —$CH_2$— may be replaced by —O—, at least one —$CH_2$—$CH_2$— may be replaced by —CH=CH—, and at least one of $Z^7$ and $Z^8$ is a single bond or —O—;

$Z^9$ and $Z^{10}$ are independently a single bond or alkylene having 1 to 12 carbons, and in the alkylene at least one —$CH_2$— may be replaced by —O—; and i, j, k are independently 0, 1 or 2.

The desirable ratio of the polymerizable compound is approximately 0.03 part by weight or more for achieving its effect and approximately 10 parts by weight or less for avoiding a poor display, when the weight of the liquid crystal composition is defined as 100 parts by weight. The more desirable ratio is in the range of approximately 0.1 part by weight to approximately 2 parts by weight. Among the polymerizable compounds, the compound (1) has a high solubility in a liquid crystal composition and a high reactivity. The desirable ratio of the compound (1) in the polymerizable compounds is 10 wt % or more. The more desirable ratio is 50 wt % or more. The especially desirable ratio is 80 wt % or more, or even 100 wt %.

The polymerizable compound is polymerized on irradiation with ultraviolet light or the like, preferably in the presence of a suitable initiator such as a photo-polymerization initiator. Suitable conditions for the polymerization, suitable types of the initiator and suitable amounts are known to a person of ordinary skill in the art and described in the literature. For example, Irgacure 651 (trade name, from BASF), Irgacure 184 (trade name, from BASF) or Darocure 1173 (trade name, from BASF), each of which is a photo-polymerization initiator, is suitable for radical polymerization. The desirable ratio of the photo-polymerization initiator is in the range of approximately 0.1 wt % to approximately 5 wt %. The more desirable ratio is in the range of approximately 1 wt % to approximately 3 wt % based on the polymerizable compound. It is feasible to arrange a liquid crystal composition including a polymerizable compound between two substrates of a liquid crystal display device and then polymerize the polymerizable compound while a voltage is applied between opposing electrode layers of the substrates. It is also feasible to arrange, between two substrates of a LCD device, a liquid crystal composition that includes a compound having been polymerized in advance.

Examples of the polymerization inhibitor include hydroquinone derivatives such as hydroquinone and 2-methylhydroquinone; 4-t-butylcatechol, 4-methoxyphenol and phenothiazine.

The optically active compound is effective in inducing a helical structure in liquid crystal molecules, giving a necessary twist angle and thus preventing a reverse twist. The helical pitch can be adjusted by addition of the optically active compound. Two or more optically active compounds may be added to adjust the temperature dependence of the helical pitch. Desirable examples of the optically active compound include the following compounds (Op-1) to (Op-18). In the compound (Op-18), the ring J is 1,4-cyclohexylene or 1,4-phenylene, and $R^{24}$ is alkyl having 1 to 10 carbons. The desirable ratio of the optically active compound is approximately 5 wt % or less, and the more desirable ratio is in the range of approximately 0.01 wt % to approximately 2 wt %.

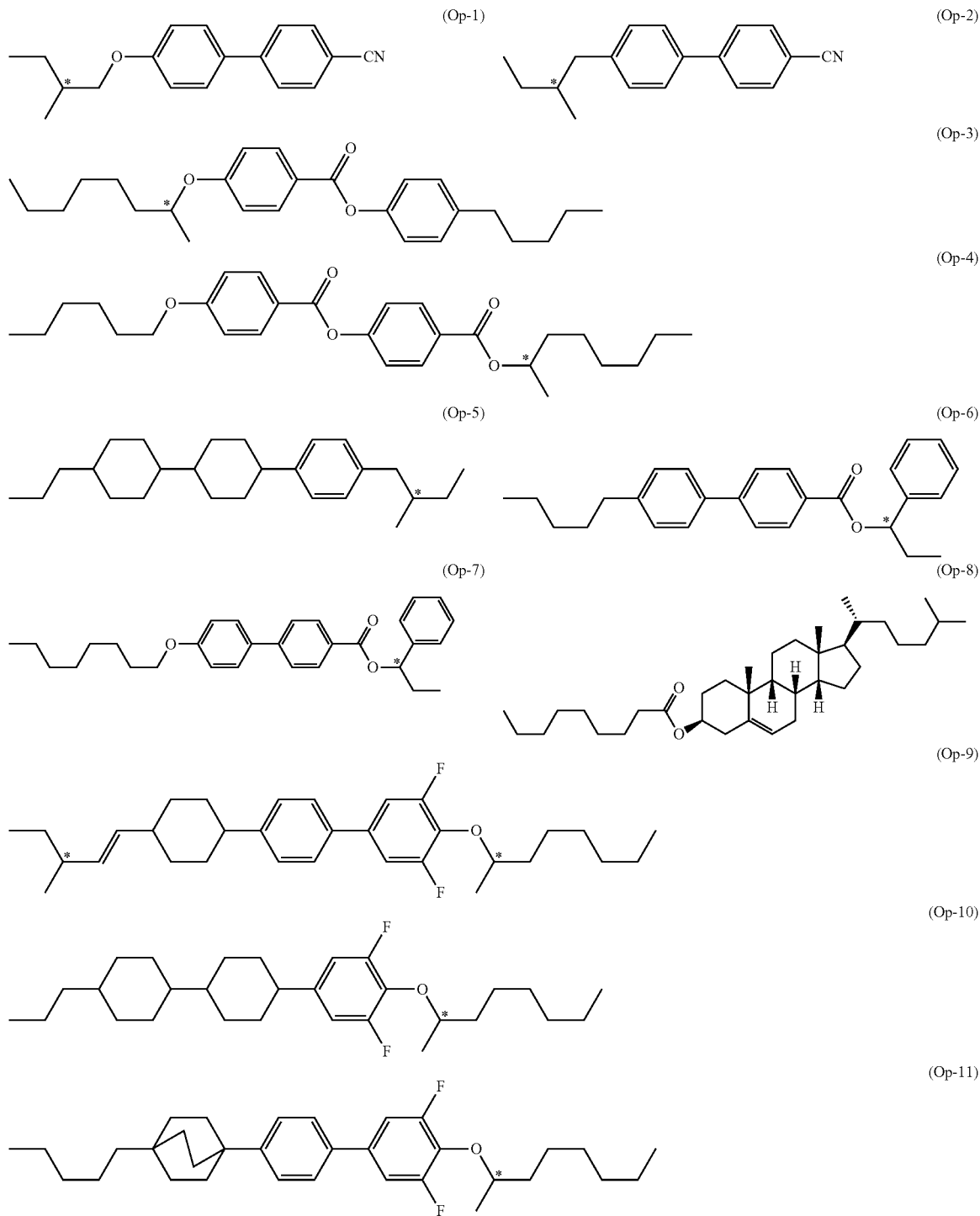

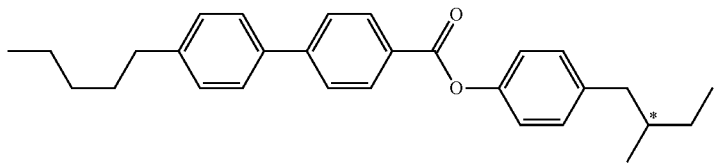
(Op-12)

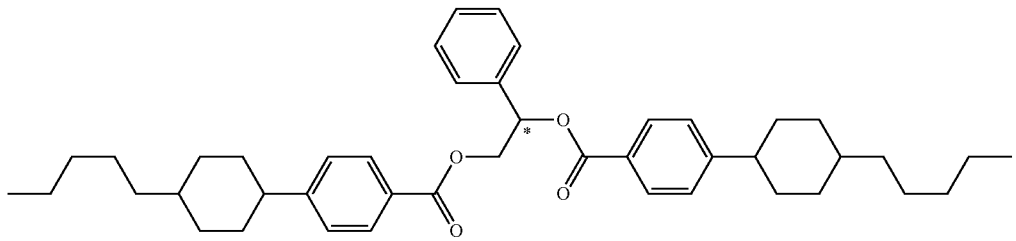
(Op-13)

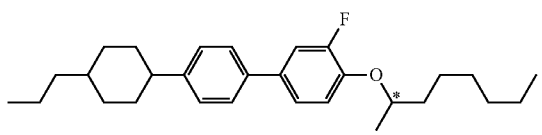
(Op-14)

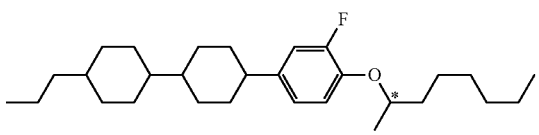
(Op-15)

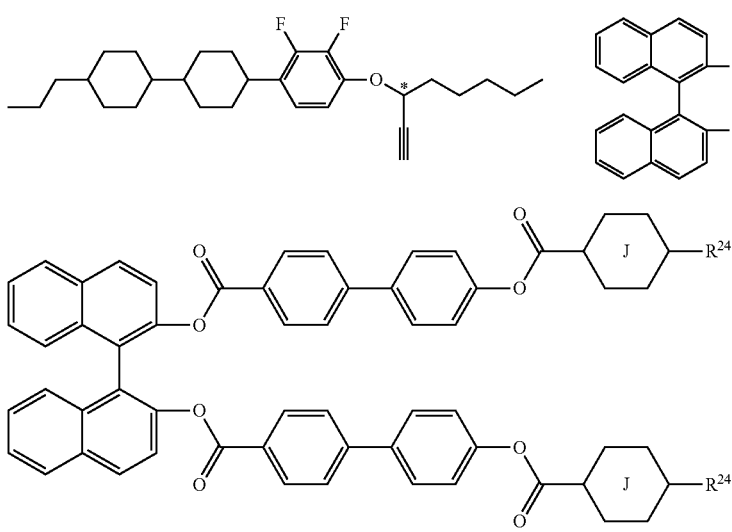
(Op-16) (Op-17) (Op-18)

The antioxidant is effective in maintaining a large voltage holding ratio. Desirable examples of the antioxidant include the compounds (AO-1) and (AO-2) described below; Irganox 415, Irganox 565, Irganox 1010, Irganox 1035, Irganox 3114 and Irganox 1098 (trade name, from BASF). The compound (AO-1) where $R^{25}$ is —$CH_3$ is effective in preventing a decrease in specific resistance that is caused by heating under air, because it has a large volatility. The compound (AO-1) where $R^{25}$ is —$C_7H_{15}$ is effective in maintaining a large voltage holding ratio at room temperature and also at a temperature close to the maximum temperature of a nematic phase even after the device has been used for a long time, because it has a small volatility. The desirable ratio of the antioxidant is approximately 50 ppm or more for achieving its effect and is approximately 600 ppm or less for avoiding lowering of the maximum temperature or avoiding raise of the minimum temperature. A more desirable ratio is in the range of approximately 100 ppm to approximately 300 ppm.

The ultraviolet light absorber is effective for preventing lowering of the maximum temperature. Desirable examples of the ultraviolet light absorber include benzophenone derivatives, benzoate derivatives and triazole derivatives. Specific examples include the compounds (AO-3) and (AO-4) described below; Tinuvin 329, Tinuvin P, Tinuvin 326, Tinuvin 234, Tinuvin 213, Tinuvin 400, Tinuvin 328 and Tinuvin 99-2 (trade name, from BASF); and 1,4-diazabicyclo[2.2.2]octane (DABCO). A light stabilizer such as an amine with steric hindrance is desirable for maintaining a large voltage holding ratio. Desirable examples of the light stabilizer include the compounds (AO-5) and (AO-6) described below; Tinuvin 144, Tinuvin 765 and Tinuvin 770DF (trade name, from BASF). The desirable ratio of the absorber or the stabilizer is approximately 50 ppm or more for achieving its effect, and is approximately 10,000 ppm or less for avoiding lowering of the maximum temperature or avoiding raise of the minimum temperature. The more desirable ratio is in the range of approximately 100 ppm to approximately 10,000 ppm.

The thermal stabilizer is also effective in maintaining a large voltage holding ratio, and a desirable example thereof is Irgafos 168 (trade name, from BASF). An antifoaming agent such as dimethyl silicone oil or methyl phenyl silicone oil is mixed in the composition for preventing foam formation. The desirable ratio of the antifoaming agent is approximately 1 ppm or more for achieving its effect, and is approximately 1,000 ppm or less for avoiding a poor display. The more desirable ratio is in the range of approximately 1 ppm to approximately 500 ppm.

(AO-1)

(AO-2)

(AO-3)

(AO-4)

(AO-5)

(AO-6)

In the compound (AO-1), $R^{25}$ is alkyl having 1 to 20 carbons, alkoxy having 1 to 20 carbons, —$COOR^{26}$ or —$CH_2CH_2COOR^{26}$, and $R^{26}$ is alkyl having 1 to 20 carbons. In the compounds (AO-2) and (AO-5), $R^{27}$ is alkyl having 1 to 20 carbons. In the compound (AO-5), the ring K and the ring L are independently 1,4-cyclohexylene or 1,4-phenylene, v is 0, 1 or 2, and $R^{28}$ is hydrogen, methyl or O. (oxygen radical).

A dichroic dye such as an azo dye or an anthraquinone dye is mixed in the composition for adapting to a device having a guest host (GH) mode. The desirable ratio of the dye is in the range of approximately 0.01 wt % to approximately 10 wt %.

Seventh, methods for synthesizing the component compounds will be described. These compounds can be synthesized by known methods. The synthetic methods will be exemplified as follows. The compound (1) is prepared by the method described in JP 2012-001526 A. Methods for forming $Z^1$ and $Z^2$ are described in WO 2010-131600 A. A method for converting ring-O—$CH_2$—CHO to ring-O—CH=CH—O-Bz is described in Scheme 4 of J. Org. Chem., 65, 2875-2886 (2000). The compound (2-1-1) and the compound (2-5-1) are prepared by the method described in JP H02-503441 A (1990). The compound (3-1-1) and the compound (3-5-1) are prepared by the method described in JP S59-176221 A (1984).

Compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), and New Experimental Chemistry Course (Shin Jikken Kagaku Kouza, in Japanese; Maruzen Co., Ltd.). The composition is prepared according to known methods using the compounds thus obtained. For example, the component compounds are mixed and dissolved in each other by heating.

Last, the use of the composition will be described. Most of the compositions have a minimum temperature of approximately −10° C. or lower, a maximum temperature of approximately 70° C. or higher, and an optical anisotropy in the range of approximately 0.07 to approximately 0.20. A device containing this composition has a large voltage holding ratio. The composition is suitable for an AM device. The composition is suitable especially for a transmission-type AM device. A composition having an optical anisotropy in the range of approximately 0.08 to approximately 0.25 may be prepared by adjusting the ratio of component compounds or by mixing with other liquid crystal compound(s). The composition can be used as a composition having a nematic phase, or as an optically active composition through addition of an optically active compound.

The composition can be used for an AM device and also for a PM device. The composition can also be used for an AM device or a PM device having a mode such as PC, TN, STN, ECB, OCB, IPS, VA or PSA. It is especially desirable to use the composition for an AM device having a PSA mode. These devices may be of a reflection type, a transmission type or a semi-transmission type. It is desirable to use the composition for a transmission-type device. The composition can be used for an amorphous silicon-TFT device or a polysilicon-TFT device. The composition can also be used for a nematic curvilinear aligned phase (NCAP) device prepared by microcapsulating the composition, and for a polymer dispersed (PD) device in which a three-dimensional network-polymer is formed in the composition.

One example of the methods for producing the liquid crystal display device is as follows. A device having two substrates called an array substrate and a color filter substrate is prepared. At least one of the substrates has an electrode layer. On the other hand, liquid crystal compounds are mixed to give a liquid crystal composition. The compound (1) is added to this composition. An additive may be added as required. The liquid crystal composition (or the liquid crystal material) is poured into the device. The device is irradiated with light while a voltage is applied. Ultraviolet light is preferable in the case of the compound (1). The compound (1) is polymerized by irradiation with light. A liquid crystal composition including a polymer is formed by the polymerization. A polymer sustained alignment (PSA) type liquid crystal display device is produced by this procedure.

In the procedure, liquid crystal molecules are oriented by the effect of an electric field when a voltage is applied. The molecules of the compound (1) are also oriented according to the orientation. A polymer where the orientation is maintained is formed since the compound (1) is polymerized by ultraviolet light under these conditions. The response time of the device is decreased by the effect of the polymer. Image burn-in can also be improved at the same time by the effect of the polymer, since the burn-in is a malfunction of liquid crystal molecules.

EXAMPLES

The invention will be explained below in more detail based on examples, but is not limited by these examples. The compounds prepared herein were identified by means of proton magnetic resonance spectroscopy ($^1$H-NMR) and so forth. The melting points of the compounds were determined by differential scanning calorimetry (DSC). First, analytical methods will be described.

$^1$H-NMR Analysis:

A model DRX-500 apparatus made by Bruker BioSpin Corporation was used for the measurement. In the measurement of $^1$H-NMR, a sample prepared in Examples or the like was dissolved in a deuterated solvent such as $CDCl_3$, and measured under the conditions of room temperature, 500 MHz and an accumulation of 24 scans. Tetramethylsilane was used as an internal standard. In the explanation of the NMR spectra, the symbols s, d, t, q and m stand for a singlet, a doublet, a triplet, a quartet, and a multiplet, respectively.

HPLC Analysis:

Model Prominence (LC-20AD; SPD-20A) made by Shimadzu Corporation was used for measurement. A column YMC-Pack ODS-A (length: 150 mm, bore: 4.6 mm, particle size: 5 micrometers) made by YMC Co., Ltd. was used. An acetonitrile/water mixture (80/20 by volume) was used as an eluent, and the flow rate was adjusted to 1 mL/minute. A UV detector, a RI detector, a Corona detector and so forth were suitably used as a detector. A wavelength of 254 nm was used for detection. A sample was dissolved in acetonitrile, and 1 microliter of the solution (0.1 wt %) was injected into the sample injector. Model C-R7Aplus made by Shimadzu Corporation was used as a recorder. The resulting chromatogram showed the retention time of peaks and the peak areas corresponding to the component compounds.

The ratio of the peak areas in a chromatogram obtained by the HPLC relates to the ratio of component compounds. In general, the percentages by weight of component compounds are not the same as the percentages of peak areas. However, the percentages by weight of component compounds may be calculated from the percentages of peak areas if the column described above is used. In this invention, this is because there is no significant difference among the correction coefficients of the component compounds.

GC Analysis:

A Gas Chromatograph Model GC-14B made by Shimadzu Corporation was used for the measurement. Helium was used as a carrier gas (2 mL/minute). The temperature of the sample injector was set at 280° C. and the temperature of the detector (FID) was set at 300° C. A capillary column DB-1 (length: 30 m, bore: 0.32 mm, film thickness: 0.25 micrometer; dimethylpolysiloxane as a stationary liquid phase; non-polar) made by Agilent Technologies Inc. was used for the separation of component compounds. After the column had been maintained at 200° C. for 2 minutes, it was further heated to 280° C. at the rate of 5° C. per minute. A sample was dissolved in acetone, and 1 microliter of the solution (0.1 wt %) was injected into the sample injector. A recorder used was a Model C-R5A Chromatopac Integrator made by Shimadzu Corporation or its equivalent. The resulting gas chromatogram showed the retention time of peaks and the peak areas corresponding to the component compounds.

Chloroform or hexane, for example, may also be used as a solvent for diluting the sample. The following capillary columns may also be used for the separation of the component compounds: HP-1 (length: 30 m, bore: 0.32 mm, film thickness: 0.25 micrometer) made by Agilent Technologies Inc., Rtx-1 (length: 30 m, bore: 0.32 mm, film thickness: 0.25 micrometer) made by Restek Corporation, BP-1 (length: 30 m, bore: 0.32 mm, film thickness: 0.25 micrometer) made by SGE International Pty. Ltd, and so forth. A capillary column CBP1-M50-025 (length: 50 m, bore: 0.25 mm, film thickness: 0.25 micrometer) made by Shimadzu Corporation may be used in order to avoid an overlap of compound peaks.

The ratio of the liquid crystal compounds included in a composition is calculated according to the following method. The liquid crystal compounds can be detected using a gas chromatograph. The ratio of the peak areas in the gas chromatogram corresponds to the ratio (molar ratio) of the liquid crystal compounds. When the capillary columns described above are used, the correction coefficient of the respective liquid crystal compounds may be regarded as one. Accordingly, the ratio (percentage by weight) of the liquid crystal compound can be calculated from the ratio of peak areas with correction for the molar ratio.

Ultraviolet and Visible Spectrophotometric Analysis:

Model PharmaSpec UV-1700 made by Shimadzu Corporation was used for the measurement. Wavelengths in the range of 190 nm to 700 nm were used for detection. A sample was dissolved in acetonitrile, giving a 0.01 mmol/L solution, which was placed in a quartz cell (optical path length: 1 cm) and measured.

DSC Measurement:

A Perkin-Elmer differential scanning calorimeter, a DSC-7 System or a Diamond DSC System, was used for the measurement. The sample was heated and then cooled at the rate of 3° C. per minute. The starting point of an endothermic peak or an exothermic peak caused by a phase change of the sample was obtained by means of extrapolation, and the melting point was determined.

Comparison of Solubility in a Liquid Crystal Composition:

A polymerizable compound was added to a liquid crystal composition and tried to be dissolved. After a certain period of time had elapsed at a certain temperature, whether or not all of the crystals were dissolved in the liquid crystal composition was observed visually.

Sample for Measurement:

A composition itself was used as a sample when the characteristics such as the maximum temperature, the viscosity and the optical anisotropy were measured. When the characteristics of a compound were measured, the sample for measurement was prepared by mixing 15 wt % of the compound and 85 wt % of a mother liquid crystal. The characteristic values of the compound were calculated from the measured values, according to the following extrapolation method: (extrapolated value)=[(measured value of a sample for measurement)−0.85×(measured value of mother liquid crystals)]/

0.15. When a smectic phase (or crystals) separated out in this ratio at 25° C., the ratio of the compound to the mother liquid crystals was changed step by step in the order of (10 wt %/90 wt %), (5 wt %/95 wt %) and (1 wt %/99 wt %). The values of the maximum temperature, the viscosity, the optical anisotropy and the dielectric anisotropy regarding the compound were obtained by the extrapolation method.

The components and their ratio in the mother liquid crystal were as follows.

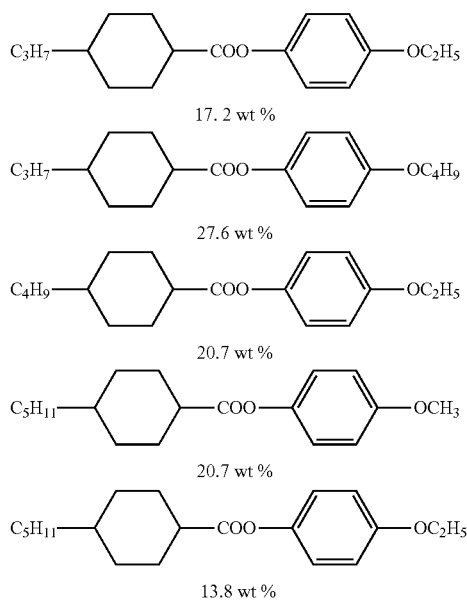

The characteristic values were measured according to the following methods. Most of them are methods described in the JEITA standards (JEITA-ED-2521B) which was deliberated and established by Japan Electronics and Information Technology Industries Association (abbreviated to JEITA), or the modified versions of the methods.

(1) Maximum Temperature of Nematic Phase (NI; ° C.):

The sample was placed on a hot plate in a melting point apparatus equipped with a polarizing microscope and was heated at the rate of 1° C. per minute. The temperature was measured when a part of the sample began to change from a nematic phase to an isotropic liquid. The upper limit of the temperature range of a nematic phase may be abbreviated to "the maximum temperature".

(2) Minimum Temperature of Nematic Phase (Tc; ° C.):

A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as <−20° C. The lower limit of the temperature range of a nematic phase may be abbreviated to "the minimum temperature".

(3) Viscosity (Bulk Viscosity; n; Measured at 20° C.; mPa·s):

The viscosity was measured by use of an E-type viscometer.

(4) Optical Anisotropy (Refractive Index Anisotropy; Δn; Measured at 25° C.):

An Abbe refractometer in which the ocular was equipped with a polarizing plate was used for the measurement, using light at the wavelength of 589 nanometers. The surface of the main prism was rubbed in one direction, and then a sample was dropped onto the main prism. A refractive index ($n_\parallel$) was measured when the direction of polarized light was parallel to that of the rubbing. A refractive index ($n_\perp$) was measured when the direction of polarized light was perpendicular to that of the rubbing. The value of optical anisotropy was calculated from the equation: $\Delta n = n_\parallel - n_\perp$.

(5) Dielectric Anisotropy (Δ∈; Measured at 25° C.):

The value of dielectric anisotropy was calculated from the equation: $\Delta\in = \in_\parallel - \in_\perp$. The dielectric constant $\in_\parallel$ and $\in_\perp$ were measured as follows.

1) Measurement of the dielectric constant $\in_\parallel$: A solution of octadecyltriethoxysilane (0.16 mL) in ethanol (20 mL) was applied to a thoroughly cleaned glass substrate. The glass substrate was rotated with a spinner, and then heated at 150° C. for one hour. The sample was poured into a VA device in which the distance between the two glass substrates (cell gap) was 4 micrometers, and then the device was sealed with an adhesive curable with ultraviolet light. Sine waves (0.5 V, 1 kHz) were applied to the device, and the dielectric constant ($\in_\parallel$) in the major axis direction of liquid crystal molecules was measured after 2 seconds.

2) Measurement of the dielectric constant $\in_\perp$: A polyimide solution was applied to a thoroughly cleaned glass substrate. The glass substrate was calcined, and then the resulting alignment film was subjected to rubbing. The sample was poured into a TN device in which the distance between the two glass substrates (cell gap) was 9 micrometers and the twist angle was 80 degrees. Sine waves (0.5 V, 1 kHz) were applied to the device, and the dielectric constant ($\in_\perp$) in the minor axis direction of liquid crystal molecules was measured after 2 seconds.

(6) Threshold Voltage (Vth; Measured at 25° C.; V):

An LCD evaluation system Model LCD-5100 made by Otsuka Electronics Co., Ltd. was used for the measurement. The light source was a halogen lamp. The sample was poured into a VA device having a normally black mode, in which the distance between the two glass substrates (cell gap) was 4 micrometers and the rubbing direction was anti-parallel, and then the device was sealed with an adhesive curable with ultraviolet light. The voltage applied to the device (60 Hz, rectangular waves) was increased stepwise from 0 V to 20 V in an increment of 0.02 V. The device was simultaneously irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was the voltage at 10% transmittance.

(7) Voltage Holding Ratio (VHR-1; Measured at 25° C.; %):

The TN device used for the measurement had a polyimide-alignment film, and the distance between the two glass substrates (cell gap) thereof was 5 micrometers. The sample was poured into the device, and then the device was sealed with an adhesive curable with ultraviolet light. A pulse voltage (60 microseconds at 5 V) was applied to the TN device to charge the device. The attenuated voltage was measured for 16.7 milliseconds with a high-speed voltmeter, and the area A between the voltage curve and the horizontal axis in a unit cycle was obtained. The voltage holding ratio was the percentage of the area A to an area B that was the area without attenuation.

(8) Voltage Holding Ratio (VHR-2; Measured at 80° C.; %):

The TN device used for measurement had a polyimide-alignment film, and the distance between the two glass substrates (cell gap) thereof was 5 micrometer. The sample was poured into the device, and then the device was sealed with an adhesive curable with ultraviolet light. A pulse voltage (60 microseconds at 5 V) was applied to the TN device to charge the device. The attenuated voltage was measured for 16.7 milliseconds with a high-speed voltmeter and the area A between the voltage curve and the horizontal axis in a unit cycle was obtained. The voltage holding ratio was a percentage of the area A to an area B that was the area without attenuation.

(9) Voltage Holding Ratio (VHR-3; Measured at 25° C.; %):

The stability to ultraviolet light was evaluated by measuring the voltage holding ratio after irradiation with ultraviolet light. The TN device used for measurement had a polyimide-alignment film, and the cell gap thereof was 5 micrometers. The sample was poured into this device, and then the device was irradiated with light for 20 minutes. The light source was an ultra high-pressure mercury lamp USH-500D (produced by Ushio, Inc.), and the distance between the device and the light source was 20 cm. In the measurement of VHR-3, the attenuated voltage was measured for 16.7 milliseconds. A composition having a large VHR-3 has a high stability to ultraviolet light. The value of VHR-3 is preferably 90% or more, and more preferably 95% or more.

(10) Voltage Holding Ratio (VHR-4; Measured at 25° C.; %):

A TN device into which the sample was poured was heated in a constant-temperature bath at 80° C. for 500 hours, and then the stability to heat was evaluated by measuring the voltage holding ratio. In the measurement of VHR-4, the attenuated voltage was measured for 16.7 milliseconds. A composition having a large VHR-4 has a high stability to heat.

(11) Response Time (τ; Measured at 25° C.; Millisecond):

An LCD evaluation system Model LCD-5100 made by Otsuka Electronics Co., Ltd. was used for the measurement. The light source was a halogen lamp. The low-pass filter was set at 5 kHz. The sample was poured into a VA device having a normally black mode, in which the cell gap between the two glass substrates was 3.2 micrometers, the alignment film was prepared from a homeotropic alignment agent, and the rubbing direction was anti-parallel, and then the device was sealed with an adhesive curable with ultraviolet light. The device was heated at 110° C. for 30 minutes (annealing). After the device was allowed to return to room temperature, it was irradiated with ultraviolet light of 25 mW/cm$^2$ for 400 seconds while a voltage of 15 volts was applied. A mercury-xenon lamp, Model Execure 4000-D made by Hoya Candeo Optronics Corp., was used for ultraviolet irradiation. Rectangular waves (60 Hz, 10 V, 0.5 second) were applied to the device. The device was simultaneously irradiated with light in the perpendicular direction, and the amount of light passing through the device was measured. The maximum amount of light corresponded to 100% transmittance, and the minimum amount of light corresponded to 0% transmittance. The response time was the period of time required for the change from 0% to 90% transmittance (rise time; millisecond).

(12) Specific Resistance (ρ; Measured at 25° C.; Ωcm):

The sample (1.0 mL) was poured into a vessel equipped with electrodes. A DC voltage of 10 V was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

The compounds described in Comparative Examples and Examples were expressed as symbols according to the definition in Table 3 below. In Table 3, the configuration of 1,4-cyclohexylene is trans. The parenthesized number next to a symbolized expression in the examples corresponds to the number of the corresponding compound. The symbol (−) means any other liquid crystal compound. The ratios (percentages) of the liquid crystal compounds mean the percentages by weight (wt %) based on the weight of the liquid crystal composition excluding the first component. The liquid crystal composition further includes an impurity. Last, the characteristic values of the composition were summarized.

TABLE 3

Method of Description of Compounds using Symbols
R—(A$_1$)—Z$_1$—...—Z$_n$—(A$_n$)—R'

| 1) Left-terminal Group R— | Symbol |
| --- | --- |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |
| CH$_2$=CHCOO— | AC— |
| CH$_2$=C(CH$_3$)COO— | MAC— |
| CH$_2$=CHOCOO— | VCA |
| CH$_2$=CHCH$_2$OCOO— | ACA— |

| 2) Right-terminal Group —R' | Symbol |
| --- | --- |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |

TABLE 3-continued
| | |
|---|---|
| —CH=CF$_2$ | —VFF |
| —COOCH$_3$ | —EMe |
| —OCOCH=CH$_2$ | —Ac |
| —OCOC(CH$_3$)=CH$_2$ | —MAC |
| 3) Bonding Group —Z$_n$— | Symbol |
|---|---|
| —C$_n$H$_{2n+1}$— | n |
| —COO— | E |
| —CH=CH—O— | VO |
| —O—CH=CH— | OV |
| —CH=CH— | V |
| —CF$_2$O— | X |
| —OCH$_2$— | O1 |
| —CH$_2$O— | 1O |
| —O— | O |
| 4) Ring Structure —A$_n$— | Symbol |
|---|---|
|  | H |
| 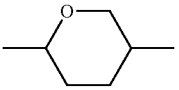 | Dh |
| 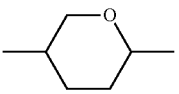 | dh |
|  | B |
| 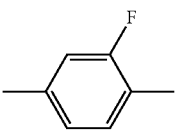 | B(F) |
| 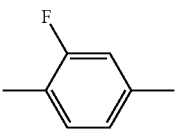 | B(2F) |
| 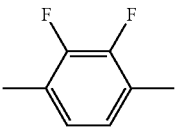 | B(2F,3F) |
| 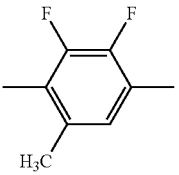 | B(2F,3F,6Me) |
| 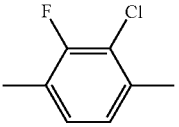 | B(2F,3CL) |

TABLE 3-continued

| Structure | Name |
|---|---|
| (methyl-dimethylbenzene) | B(Me) |
| (CF3-dimethylbenzene) | B(CF3) |
| (7,8-difluorochroman) | Cro(7F,8F) |
| (1,5-naphthalene) | Np(1,5) |
| (2,6-naphthalene) | Np(2,6) |

5) Examples of Description

Example 1. MAC-VO-BB-OV-MAC

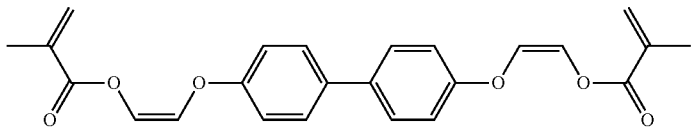 [SMILES: C=C(C)C(=O)O/C=C\Oc1ccc(-c2ccc(O/C=C\OC(=O)C(=C)C)cc2)cc1]

Example 2. AC-1-BB-1-AC

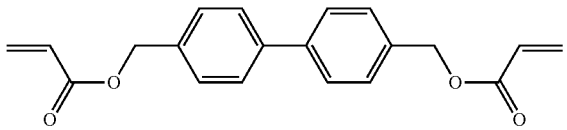

Comparative Example M1

For comparison, the following liquid crystal composition in which the first component of the invention was not included was prepared.

| Compound | Code | % |
|---|---|---|
| V-HB(2F,3F)-O2 | (2-1-1) | 15% |
| 5-H2B(2F,3F)-O2 | (2-2-1) | 10% |
| 2-HBB(2F,3F)-O2 | (2-8-1) | 4% |
| 3-HBB(2F,3F)-O2 | (2-8-1) | 10% |
| 5-HBB(2F,3F)-O2 | (2-8-1) | 10% |
| 2-HHB(2F,3CL)-O2 | (2-9-1) | 2% |
| 3-HHB(2F,3CL)-O2 | (2-9-1) | 3% |
| 4-HHB(2F,3CL)-O2 | (2-9-1) | 3% |
| 5-HHB(2F,3CL)-O2 | (2-9-1) | 3% |
| 2-HH-3 | (3-1-1) | 27% |
| 3-HB-O2 | (3-2-1) | 2% |
| 3-HHB-1 | (3-5-1) | 3% |
| 3-HHB-3 | (3-5-1) | 5% |
| 3-HHB-O1 | (3-5-1) | 3% |

The above composition was measured according to the methods (1) to (12) described above and the characteristic values were as follows. The response time ($\tau$) was 7.9 ms.

NI=78.3° C.; Tc<−20° C.; $\Delta n$=0.094; $\Delta\epsilon$=−3.0; Vth=2.13 V; VHR-1=99.3%; VHR-2=98.1%; VHR-3=98.2%.

Example M1

| | | |
|---|---|---|
| V-HB(2F,3F)-O2 | (2-1-1) | 15% |
| 5-H2B(2F,3F)-O2 | (2-2-1) | 10% |
| 2-HBB(2F,3F)-O2 | (2-8-1) | 4% |
| 3-HBB(2F,3F)-O2 | (2-8-1) | 10% |
| 5-HBB(2F,3F)-O2 | (2-8-1) | 10% |
| 2-HHB(2F,3CL)-O2 | (2-9-1) | 2% |
| 3-HHB(2F,3CL)-O2 | (2-9-1) | 3% |
| 4-HHB(2F,3CL)-O2 | (2-9-1) | 3% |
| 5-HHB(2F,3CL)-O2 | (2-9-1) | 3% |
| 2-HH-3 | (3-1-1) | 27% |
| 3-HB-O2 | (3-2-1) | 2% |
| 3-HHB-1 | (3-5-1) | 3% |
| 3-HHB-3 | (3-5-1) | 5% |
| 3-HHB-O1 | (3-5-1) | 3% |

The above composition is the same as that in Comparative Example M1. 0.3 Part by weight of the compound (1-1-1-1) as a first component of the invention was added to 100 parts by weight of this composition.

MAC-VO-BB-OV-MAC      (1-1-1-1)

The characteristic values of the resulting composition were as follows. The response time (τ) was 4.2 ms.
NI=78.8° C.; Tc<−20° C.; Δn=0.097; Δ∈=−3.0; Vth=2.15 V; VHR-1=99.4%; VHR-2=98.3%; VHR-3=98.1%.

From the results of Comparative Example M1 and Example M1, it was found that the device using the liquid crystal composition including the polymer formed from the polymerizable compound (1-1-1-1) has a shorter response time.

Example M2

| | | |
|---|---|---|
| 3-HB(2F,3F)-O2 | (2-1-1) | 6% |
| 3-H2B(2F,3F)-O2 | (2-2-1) | 17% |
| 5-H2B(2F,3F)-O2 | (2-2-1) | 10% |
| 3-HHB(2F,3F)-O2 | (2-5-1) | 7% |
| 5-HHB(2F,3F)-O2 | (2-5-1) | 6% |
| 3-HBB(2F,3F)-O2 | (2-8-1) | 5% |
| 5-HBB(2F,3F)-O2 | (2-8-1) | 10% |
| 2-HH-3 | (3-1-1) | 20% |
| 3-HH-4 | (3-1-1) | 4% |
| 5-HB-O2 | (3-2-1) | 4% |
| 3-HHB-1 | (3-5-1) | 4% |
| 5-HBB(F)B-2 | (3-13-1) | 7% |

0.3 Part by weight of the compound (1-1-1-1), which is the first component of the invention, was added to 100 parts by weight of the above composition.

MAC-VO-BB-OV-MAC      (1-1-1-1)

The characteristic values of the resulting composition were as follows. The response time (τ) was 4.4 ms.
NI=76.6° C.; Tc<−20° C.; Δn=0.095; Δ∈=−3.1; Vth=2.36 V; VHR-1=99.3%; VHR-2=98.7%; VHR-3=98.5%.

Example M3

| | | |
|---|---|---|
| 3-HB(2F,3F)-O2 | (2-1-1) | 6% |
| 3-H2B(2F,3F)-O2 | (2-2-1) | 15% |
| 5-H2B(2F,3F)-O2 | (2-2-1) | 5% |
| 3-BB(2F,3F)-O2 | (2-3-1) | 5% |
| 3-H1OB(2F,3F)-O2 | (2-4-1) | 5% |
| 3-HH2B(2F,3F)-O2 | (2-6-1) | 5% |
| 2-HBB(2F,3F)-O2 | (2-8-1) | 5% |
| 4-HBB(2F,3F)-O2 | (2-8-1) | 6% |
| 5-HBB(2F,3F)-O2 | (2-8-1) | 6% |
| 2-HH-3 | (3-1-1) | 5% |
| 3-HH-4 | (3-1-1) | 10% |
| 1-BB-3 | (3-3-1) | 4% |
| 3-HHB-1 | (3-5-1) | 4% |
| 3-HHB-3 | (3-5-1) | 5% |
| 3-HHB-O1 | (3-5-1) | 3% |
| 5-HBB(F)B-2 | (3-13-1) | 6% |
| 5-HBB(F)B-3 | (3-13-1) | 5% |

0.3 Part by weight of the compound (1-1-1-2), which is the first component of the invention, was added to 100 parts by weight of the above composition.

AC-VO-BB-OV-AC      (1-1-1-2)

The characteristic values of the resulting composition were as follows. The response time (τ) was 5.0 ms.
NI=87.4° C.; Tc<−20° C.; Δn=0.119; Δ∈=−3.4; Vth=2.26 V; VHR-1=99.0%; VHR-2=98.8%; VHR-3=98.5%.

Example M4

| | | |
|---|---|---|
| 3-HB(2F,3F)-O2 | (2-1-1) | 10% |
| 3-BB(2F,3F)-O2 | (2-3-1) | 7% |
| 3-H1OB(2F,3F)-O2 | (2-4-1) | 6% |
| 3-HH1OB(2F,3F)-O2 | (2-7-1) | 3% |
| 2-HBB(2F,3F)-O2 | (2-8-1) | 10% |
| 3-HBB(2F,3F)-O2 | (2-8-1) | 5% |
| 3-dhHB(2F,3F)-O2 | (2-14-1) | 3% |
| 3-HH1OCro(7F,8F)-5 | (2-19-1) | 5% |
| 2-HH-5 | (3-1-1) | 10% |
| 3-HH-4 | (3-1-1) | 8% |
| 5-HB-O2 | (3-2-1) | 8% |
| 1-BB-3 | (3-3-1) | 7% |
| 3-HHB-1 | (3-5-1) | 3% |
| 3-HHB-O1 | (3-5-1) | 2% |
| 5-HBB-2 | (3-6-1) | 4% |
| 3-HHEBH-3 | (3-10-1) | 2% |
| 3-HHEBH-5 | (3-10-1) | 2% |
| 3-HBBH-5 | (3-11-1) | 3% |
| 5-HBB(F)B-2 | (3-13-1) | 2% |

0.4 Part by weight of the compound (1-1-1-2), which is the first component of the invention, was added to 100 parts by weight of the above composition.

AC-VO-BB-OV-AC      (1-1-1-2)

The characteristic values of the resulting composition were as follows. The response time (τ) was 4.9 ms.
NI=87.5° C.; Tc<−20° C.; Δn=0.111; Δ∈=−2.8; Vth=2.39 V; VHR-1=99.1%; VHR-2=98.7%; VHR-3=98.1%.

Example M5

| | | |
|---|---|---|
| 3-HB(2F,3F)-O2 | (2-1-1) | 10% |
| 3-H2B(2F,3F)-O2 | (2-2-1) | 13% |
| 5-H2B(2F,3F)-O2 | (2-2-1) | 12% |
| 3-BB(2F,3F)-O2 | (2-3-1) | 3% |
| 5-H1OB(2F,3F)-O2 | (2-4-1) | 5% |
| 5-HH1OB(2F,3F)-O2 | (2-7-1) | 6% |
| 5-HBB(2F,3F)-O2 | (2-8-1) | 7% |
| 3-HHB(2F,3CL)-O2 | (2-9-1) | 4% |
| 2-HH-3 | (3-1-1) | 8% |
| 3-HHEH-3 | (3-4-1) | 2% |
| 3-HHEH-5 | (3-4-1) | 2% |
| 4-HHEH-3 | (3-4-1) | 2% |

| | | |
|---|---|---|
| 4-HHEH-5 | (3-4-1) | 2% |
| 3-HHB-1 | (3-5-1) | 9% |
| 3-HHB-3 | (3-5-1) | 7% |
| 3-HHB-O1 | (3-5-1) | 3% |
| 3-HHEBH-3 | (3-10-1) | 2% |
| 3-HHEBH-5 | (3-10-1) | 3% |

0.3 Part by weight of the compound (1-1-1-2), which is the first component of the invention, was added to 100 parts by weight of the above composition.

AC-VO-BB-OV-AC (1-1-1-2)

The characteristic values of the resulting composition were as follows. The response time ($\tau$) was 5.2 ms.

NI=89.8° C.; Tc<−20° C.; $\Delta n$=0.093; $\Delta\epsilon$=−4.1; Vth=2.13 V; VHR-1=99.3%; VHR-2=98.5%; VHR-3=98.6%.

Example M6

| | | |
|---|---|---|
| V-HB(2F,3F)-O2 | (2-1-1) | 6% |
| V-HB(2F,3F)-O3 | (2-1-1) | 5% |
| 3-H2B(2F,3F)-O2 | (2-2-1) | 5% |
| 3-HH1OB(2F,3F)-O2 | (2-7-1) | 5% |
| 4-HBB(2F,3F)-O2 | (2-8-1) | 4% |
| 5-HBB(2F,3F)-O2 | (2-8-1) | 7% |
| 3-HDhB(2F,3F)-O2 | (2-13-1) | 5% |
| 3-dhBB(2F,3F)-O2 | (2-15-1) | 6% |
| 3-HH1OCro(7F,8F)-5 | (2-19-1) | 8% |
| 2-HH-3 | (3-1-1) | 16% |
| 3-HH-5 | (3-1-1) | 5% |
| 3-HB-O1 | (3-2-1) | 6% |
| 1-BB-3 | (3-3-1) | 5% |
| 3-HHB-1 | (3-5-1) | 5% |
| 3-HHB-O1 | (3-5-1) | 3% |
| 3-HBB-2 | (3-6-1) | 6% |
| 3-B(F)BB-2 | (3-8-1) | 3% |

0.2 Part by weight of the compound (1-1-1-1) and 0.1 part by weight of the compound (1-1-1-2), which are the first component of the invention, were added to 100 parts by weight of the above composition.

MAC-VO-BB-OV-MAC (1-1-1-1)

AC-VO-BB-OV-AC (1-1-1-2)

The characteristic values of the resulting composition were as follows. The response time ($\tau$) was 4.4 ms.

NI=82.5° C.; Tc<−20° C.; $\Delta n$=0.106; $\Delta\epsilon$=−3.1; Vth=2.25 V; VHR-1=99.5%; VHR-2=98.7%; VHR-3=98.8%.

Example M7

| | | |
|---|---|---|
| V-HB(2F,3F)-O2 | (2-1-1) | 10% |
| 3-H2B(2F,3F)-O2 | (2-2-1) | 5% |
| V2-BB(2F,3F)-O2 | (2-3-1) | 5% |
| 3-H1OB(2F,3F)-O2 | (2-4-1) | 6% |
| 3-HBB(2F,3F)-O2 | (2-8-1) | 6% |
| 3-HHB(2F,3CL)-O2 | (2-9-1) | 3% |
| 3-DhHB(2F,3F)-O2 | (2-12-1) | 3% |
| 3-HDhB(2F,3F)-O2 | (2-13-1) | 3% |
| 3-HH1OCro(7F,8F)-5 | (2-19-1) | 5% |
| 2-HH-3 | (3-1-1) | 19% |
| 5-HB-O2 | (3-2-1) | 5% |
| V2-BB-1 | (3-3-1) | 3% |
| 3-HHB-1 | (3-5-1) | 4% |
| 3-HHB-3 | (3-5-1) | 7% |
| 3-HHB-O1 | (3-5-1) | 4% |
| 2-BB(F)B-3 | (3-7-1) | 4% |
| 3-HB(F)BH-3 | (3-12-1) | 3% |
| 5-HBB(F)B-2 | (3-13-1) | 5% |

0.2 Part by weight of the compound (1-1-1-1) and 0.1 part by weight of the compound (1-1-1-2) that are the first component of the invention and 0.1 part by weight of the polymerizable compound (6-1-1) that is not the first component of the invention were added to 100 parts by weight of the above composition.

MAC-VO-BB-OV-MAC (1-1-1-1)

AC-VO-BB-OV-AC (1-1-1-2)

MAC-BB-MAC (6-1-1)

The characteristic values of the resulting composition were as follows. The response time (t) was 4.1 ms.

NI=83.8° C.; Tc<−20° C.; $\Delta n$=0.111; $\Delta\epsilon$=−2.6; Vth=2.33 V; VHR-1=99.2%; VHR-2=98.6%; VHR-3=98.5%.

Example M8

| | | |
|---|---|---|
| V-HB(2F,3F)-O2 | (2-1-1) | 14% |
| 3-H2B(2F,3F)-O4 | (2-2-1) | 5% |
| 3-HBB(2F,3F)-O2 | (2-8-1) | 10% |
| 4-HBB(2F,3F)-O2 | (2-8-1) | 4% |
| 5-HBB(2F,3F)-O2 | (2-8-1) | 5% |
| 3-HH1OCro(7F,8F)-5 | (2-19-1) | 7% |
| 2-HH-3 | (3-1-1) | 23% |
| 3-HH-O1 | (3-1-1) | 5% |
| 3-HH-V | (3-1-1) | 3% |
| 4-HHEH-3 | (3-4-1) | 3% |
| 3-HHB-1 | (3-5-1) | 6% |
| 3-HHB-3 | (3-5-1) | 6% |
| 3-HHB-O1 | (3-5-1) | 3% |
| 2-BB(F)B-5 | (3-7-1) | 3% |
| 3-B(F)BB-2 | (3-8-1) | 3% |

0.1 Part by weight of the compound (1-1-1-1) that is the first component of the invention and 0.1 part by weight of the polymerizable compound (6-1-2), 0.1 part by weight of the polymerizable compound (6-1-3) and 0.1 part by weight of the polymerizable compound (6-1-4) that are not the first component of the invention were added to 100 parts by weight of the above composition.

MAC-VO-BB-OV-MAC (1-1-1-1)

MAC-B(2F)B-MAC (6-1-2)

MAC-VO-BB-MAC (6-1-3)

AC-VO-BB-MAC (6-1-4)

The characteristic values of the resulting composition were as follows. The response time ($\tau$) was 4.0 ms.

NI=81.3° C.; Tc<−20° C.; $\Delta n$=0.098; $\Delta\epsilon$=−2.6; Vth=2.25 V; VHR-1=99.5%; VHR-2=98.5%; VHR-3=98.6%.

Example M9

| | | |
|---|---|---|
| 3-H2B(2F,3F)-O2 | (2-2-1) | 20% |
| 2-HHB(2F,3F)-O2 | (2-5-1) | 7% |
| 3-HH1OB(2F,3F)-O2 | (2-7-1) | 10% |
| 3-HH1OB(2F,3F)-1 | (2-7-1) | 3% |

-continued

| | | |
|---|---|---|
| 3-HBB(2F,3F)-O2 | (2-8-1) | 9% |
| 3-HHB(2F,3CL)-O2 | (2-9-1) | 5% |
| 2-HH-5 | (3-1-1) | 4% |
| 3-HH-4 | (3-1-1) | 15% |
| 3-HH-V | (3-1-1) | 8% |
| 3-HH-V1 | (3-1-1) | 4% |
| 3-HB-O2 | (3-2-1) | 6% |
| 3-HHB-3 | (3-5-1) | 6% |
| 3-HB(F)HH-2 | (3-9-1) | 3% |

0.1 Part by weight of the compound (1-1-1-2) that is the first component of the invention and 0.1 part by weight of the polymerizable compound (6-1-5) and 0.1 part by weight of the polymerizable compound (6-4-1) that are not the first component of the invention were added to 100 parts by weight of the above composition.

AC-VO-BB-OV-AC   (1-1-1-2)

AC-VO-BB-AC   (6-1-5)

MAC-VO-BB(2F)B-MAC   (6-4-1)

The characteristic value s of the resulting composition were as follows. The response time (τ) was 4.1 ms.
NI=81.9° C.; Tc<−20° C.; Δn=0.084; Δ∈=−2.8; Vth=2.37 V; VHR-1=99.1%; VHR-2=98.4%; VHR-3=98.7%.

Example M10

| | | |
|---|---|---|
| V-HB(2F,3F)-O2 | (2-1-1) | 6% |
| 3-H2B(2F,3F)-O2 | (2-2-1) | 5% |
| 3-BB(2F,3F)-O2 | (2-3-1) | 5% |
| 3-HH1OB(2F,3F)-O2 | (2-7-1) | 5% |
| 4-HBB(2F,3F)-O2 | (2-8-1) | 4% |
| 5-HBB(2F,3F)-O2 | (2-8-1) | 7% |
| 3-HDhB(2F,3F)-O2 | (2-13-1) | 5% |
| 3-dhBB(2F,3F)-O2 | (2-15-1) | 6% |
| 3-HH1OCro(7F,8F)-5 | (2-19-1) | 8% |
| 2-HH-3 | (3-1-1) | 16% |
| 3-HH-5 | (3-1-1) | 5% |
| 3-HB-O1 | (3-2-1) | 6% |
| 1-BB-3 | (3-3-1) | 5% |
| 3-HHB-1 | (3-5-1) | 5% |
| 3-HHB-O1 | (3-5-1) | 3% |
| 3-HBB-2 | (3-6-1) | 6% |
| 3-B(F)BB-2 | (3-8-1) | 3% |

0.1 Part by weight of the compound (1-2-1-1) that is the first component of the invention and 0.1 part by weight of the polymerizable compound (6-1-2), 0.1 part by weight of the polymerizable compound (6-1-4) and 0.1 part by weight of the polymerizable compound (6-4-1) that are not the first component of the invention were added to 100 parts by weight of the above composition.

MAC-VO-BB(2F)B-OV-MAC   (1-2-1-1)

MAC-B(2F)B-MAC   (6-1-2)

AC-VO-BB-MAC   (6-1-4)

MAC-VO-BB(2F)B-MAC   (6-4-1)

The characteristic values of the resulting composition were as follows. The response time (τ) was 4.4 ms.
NI=84.1° C.; Tc<−20° C.; Δn=0.112; Δ∈=−3.1; Vth=2.23 V; VHR-1=99.6%; VHR-2=98.7%; VHR-3=98.8%.

Example M11

| | | |
|---|---|---|
| 3-H2B(2F,3F)-O2 | (2-2-1) | 15% |
| 5-BB(2F,3F)-O2 | (2-3-1) | 5% |
| 2-HHB(2F,3F)-O2 | (2-5-1) | 7% |
| 3-HH1OB(2F,3F)-O2 | (2-7-1) | 10% |
| 3-HH1OB(2F,3F)-1 | (2-7-1) | 3% |
| 3-HBB(2F,3F)-O2 | (2-8-1) | 9% |
| 3-HHB(2F,3CL)-O2 | (2-9-1) | 5% |
| 2-HH-5 | (3-1-1) | 4% |
| 3-HH-4 | (3-1-1) | 15% |
| 3-HH-V | (3-1-1) | 8% |
| 3-HH-V1 | (3-1-1) | 4% |
| 3-HB-O2 | (3-2-1) | 6% |
| 3-HHB-3 | (3-5-1) | 6% |
| 3-HB(F)HH-2 | (3-9-1) | 3% |

0.1 Part by weight of the compound (1-1-1-2), 0.1 part by weight of the compound (1-2-1-1) and 0.1 part by weight of the compound (1-2-1-2) that are the first component of the invention and 0.1 part by weight of the polymerizable compound (6-1-2) and 0.1 part by weight of the polymerizable compound (6-4-1) that are not the first component of the invention were added to 100 parts by weight of the above composition.

AC-VO-BB-OV-AC   (1-1-1-2)

MAC-VO-BB(2F)B-OV-MAC   (1-2-1-1)

AC-VO-BB(2F)B-OV-AC   (1-2-1-2)

MAC-B(2F)B-MAC   (6-1-2)

MAC-VO-BB(2F)B-MAC   (6-4-1)

The characteristic values of the resulting composition were as follows. The response time (τ) was 4.3 ms.
NI=82.0° C.; Tc<−20° C.; Δn=0.087; Δ∈=−2.8; Vth=2.37 V; VHR-1=99.2%; VHR-2=98.6%; VHR-3=98.8%.

Example M12

| | | |
|---|---|---|
| 5-H2B(2F,3F)-O2 | (2-2-1) | 17% |
| 3-BB(2F,3F)-O2 | (2-3-1) | 5% |
| 3-HH1OB(2F,3F)-O2 | (2-7-1) | 8% |
| 3-HHB(2F,3CL)-O2 | (2-9-1) | 4% |
| 4-HHB(2F,3CL)-O2 | (2-9-1) | 3% |
| 5-HHB(2F,3CL)-O2 | (2-9-1) | 3% |
| 3-HBB(2F,3CL)-O2 | (2-10-1) | 8% |
| 2-BB(2F,3F)B-3 | (2-11-1) | 4% |
| 3-HH2B(2F,3F,6Me)-O2 | (2-16-1) | 3% |
| 3-HH1OB(2F,3F,6Me)-O2 | (2-17-1) | 3% |
| 5-H1OCro(7F,8F)-5 | (2-18-1) | 3% |
| 3-HH-V | (3-1-1) | 27% |
| V-HHB-1 | (3-5-1) | 7% |
| 2-BB(F)B-3 | (3-7-1) | 2% |
| 3-HHEBH-3 | (3-10-1) | 3% |

0.1 Part by weight of the compound (1-2-1-1) and 0.1 part by weight of the compound (1-3-1-1) that are the first component of the invention and 0.1 part by weight of the polymerizable compound (6-1-2) that is not the first component of the invention were added to 100 parts by weight of the above composition.

MAC-VO-BB(2F)B-OV-MAC (1-2-1-1)

Ac-VO-Np(1,5)-OV-Ac (1-3-1-1)

MAC-B(2F)B-MAC (6-1-2)

The characteristic values of the resulting composition were as follows. The response time (τ) was 4.6 ms.
NI=82.4° C.; Tc<−20° C.; Δn=0.098; Δε=−2.9; Vth=2.28 V; VHR-1=99.1; VHR-2=98.4; VHR-3=98.7%.

The response time in Comparative Example M1 was 7.9 ms. On the other hand, the response time in Example M1 to Example M12 was 4.0 ms to 5.2 ms. As was shown here, the device in Examples had a shorter response time than that in Comparative example M1. Accordingly, it is concluded that the liquid crystal composition of the invention has more excellent characteristics than the liquid crystal composition shown in Comparative Example M1.

INDUSTRIAL APPLICABILITY

The liquid crystal composition of the invention includes a polymerizable compound and is good in at least one of characteristics such as a high maximum temperature, a low minimum temperature, a small viscosity, a suitable optical anisotropy, a large negative dielectric anisotropy and a large specific resistance, or has suitable balance between at least two of the characteristics. A liquid crystal display device containing the composition can be widely used for a liquid crystal projector, a liquid crystal television and so forth.

The invention has been disclosed in the preferred embodiments, but is not limited thereto. It is known to one of ordinary skill in the art that some modifications and innovations may be made without departing from the spirit and scope of this invention. Hence, the scope of this invention should be defined by the following claims.

What is claimed is:

1. A liquid crystal composition including at least one compound selected from the group of compounds represented by formula (1) as a first component and at least one compound selected from the group of compounds represented by formula (2) as a second component:

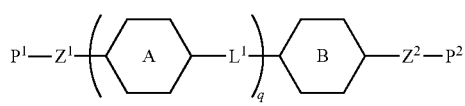

(1)

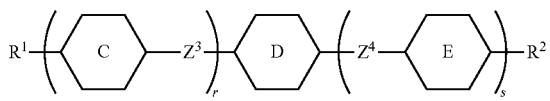

(2)

wherein in formula (1),
P$^1$ and P$^2$ are independently a group represented by formula (P-1):

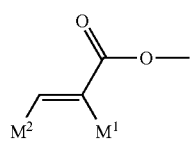

(P-1)

wherein in formula (P-1), M$^1$ and M$^2$ are independently hydrogen, fluorine, methyl or trifluoromethyl;

ring A and ring B are independently 1,4-cyclohexylene, 1,4-cyclohexenylene, 1,4-phenylene, naphthalene-1,4-diyl, naphthalene-1,5-diyl, naphthalene-2,6-diyl, tetrahydropyran-2,5-diyl, 1,3-dioxane-2,5-diyl, pyrimidine-2,5-diyl or pyridine-2,5-diyl, and in these groups at least one hydrogen may be replaced by halogen, alkyl having 1 to 12 carbons, or alkyl having 1 to 12 carbons in which at least one hydrogen has been replaced by halogen;

Z$^1$ and Z$^2$ are independently alkylene having 2 to 10 carbons in which at least one —CH$_2$—CH$_2$— is replaced by —CH═CH— or —C≡C—, and in the alkylene at least one —CH$_2$— may be replaced by —O—, —COO—, —OCO— or —OCOO—, wherein at least one of Z$^1$ and Z$^2$ is —CH═CH—O—;

L$^1$ is independently a single bond, —COO— or —CH═CH—; and q is 0, 1, 2 or 3;

and in formula (2),

R$^1$ and R$^2$ are independently alkyl having 1 to 12 carbons, alkoxy having 1 to 12 carbons, or alkenyl having 2 to 12 carbons;

ring C and ring E are independently 1,4-cyclohexylene, tetrahydropyran-2,5-diyl, 1,4-phenylene, 2-fluoro-1,4-phenylene or 3-fluoro-1,4-phenylene;

ring D is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl;

Z$^3$ and Z$^4$ are independently a single bond, ethylene, methyleneoxy or carbonyloxy; and r is 1, 2 or 3, s is 0 or 1, and the sum of r and s is 3 or less.

2. The liquid crystal composition according to claim 1, including at least one compound selected from the group of compounds represented by formula (1-1) and formula (1-2) as the first component:

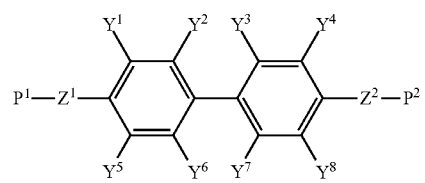

(1-1)

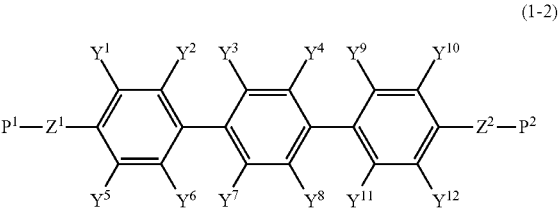

(1-2)

wherein P$^1$ and P$^2$ are independently a group represented by formula (P-1):

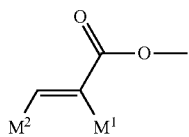
(P-1)

wherein in formula (P-1), $M^1$ and $M^2$ are independently hydrogen, fluorine, methyl or trifluoromethyl;

$Z^1$ and $Z^2$ are independently alkylene having 2 to 10 carbons in which at least one —$CH_2$—$CH_2$— is replaced by —CH=CH— or —C≡C— and in the alkylene at least one —$CH_2$— may be replaced by —O—, —COO—, —OCO— or —OCOO—, wherein at least one of $Z^1$ and $Z^2$ is —CH=CH—O—; and $Y^1$ to $Y^{12}$ are independently hydrogen, fluorine, methyl or trifluoromethyl.

3. The liquid crystal composition according to claim 1, including at least one compound selected from the group of compounds represented by formula (1) in which both $Z^1$ and $Z^2$ have —CH=CH—, as the first component.

4. The liquid crystal composition according to claim 1, wherein the first component includes at least two compounds.

5. The liquid crystal composition according to claim 1, further including at least one polymerizable compound excluding formula (1).

6. The liquid crystal composition according to claim 1, wherein the second component is at least one compound selected from the group of compounds represented by formula (2-1) to formula (2-19):

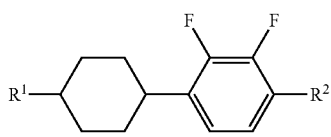
(2-1)

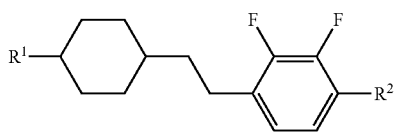
(2-2)

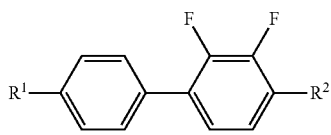
(2-3)

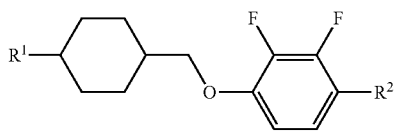
(2-4)

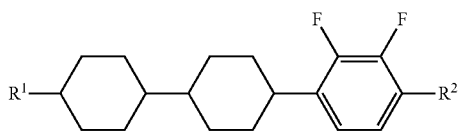
(2-5)

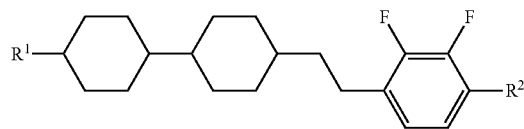
(2-6)

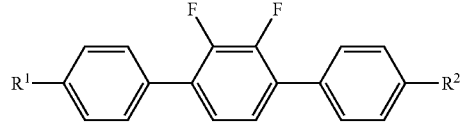
(2-7)

(2-8)

(2-9)

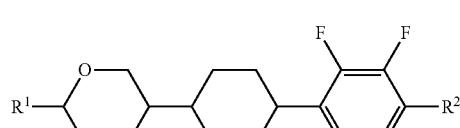
(2-10)

(2-11)

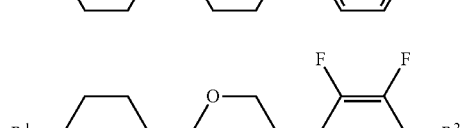
(2-12)

(2-13)

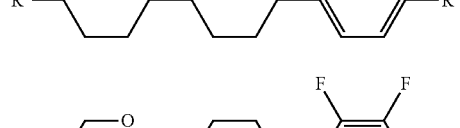
(2-14)

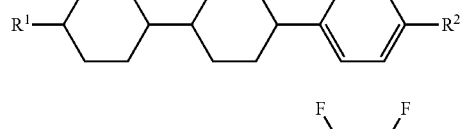
(2-15)

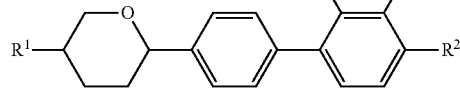

(2-16)

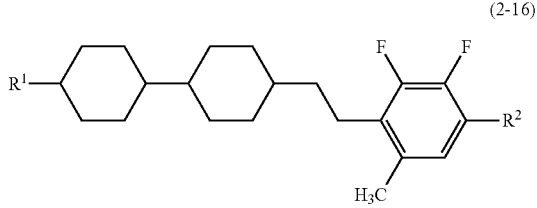

(2-17)

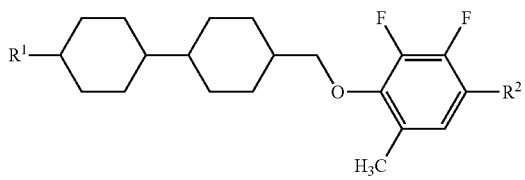

(2-18)

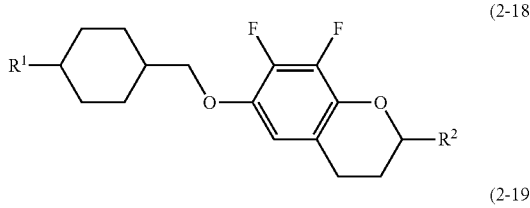

(2-19)

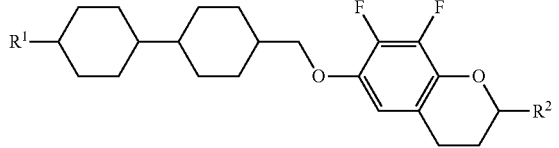

wherein $R^1$ and $R^2$ are independently alkyl having 1 to 12 carbons, alkoxy having 1 to 12 carbons, or alkenyl having 2 to 12 carbons.

7. The liquid crystal composition according to claim 6, including at least one compound selected from the group of compounds represented by formula (2-3), as the second component.

8. The liquid crystal composition according to claim 6, including at least one compound selected from the group of compounds represented by formula (2-5), as the second component.

9. The liquid crystal composition according to claim 1, wherein a ratio of the second component is in a range of 10 wt % to 100 wt % based on a weight of the liquid crystal composition excluding any polymerizable compound that is or is not the first component, and a ratio of the polymerizable compound that is or is not the first component is in a range of 0.03 part by weight to 10 parts by weight based on 100 parts by weight of the liquid crystal composition excluding the polymerizable compound that is or is not the first component.

10. The liquid crystal composition according to claim 1, further including at least one compound selected from the group of compounds represented by formula (3) as a third component:

(3)

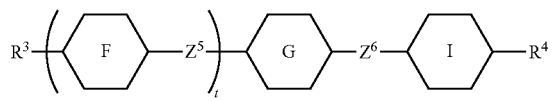

wherein $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine; ring F, ring G and ring I are independently 1,4-cyclohexylene, 1,4-phenylene, 2-fluoro-1,4-phenylene or 3-fluoro-1,4-phenylene; $Z^5$ and $Z^6$ are independently a single bond, ethylene, methyleneoxy or carbonyloxy; and t is 0, 1 or 2.

11. The liquid crystal composition according to claim 10, including at least one compound selected from the group of compounds represented by formula (3-1) to formula (3-13), as the third component:

(3-1)

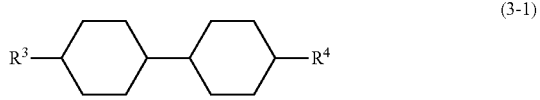

(3-2)

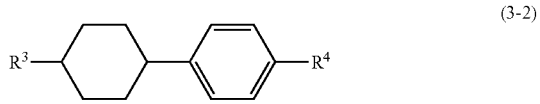

(3-3)

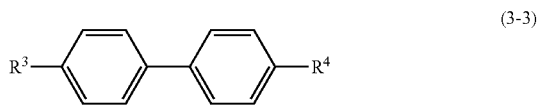

(3-4)

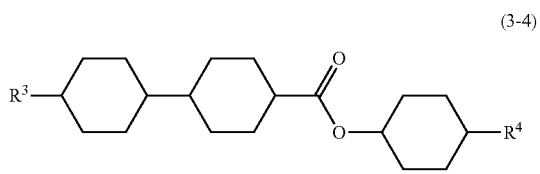

(3-5)

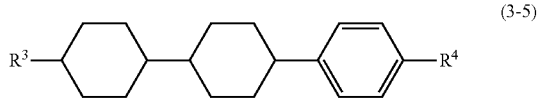

(3-6)

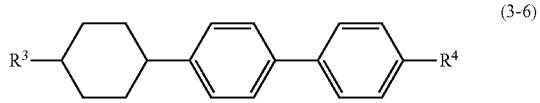

(3-7)

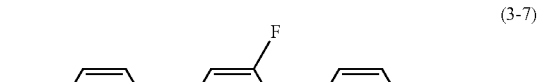

(3-8)

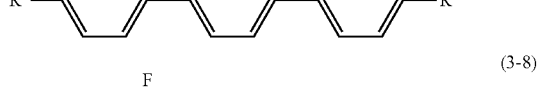

(3-9)

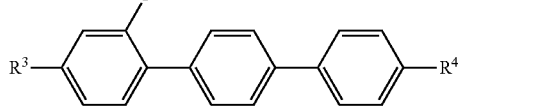

(3-10)

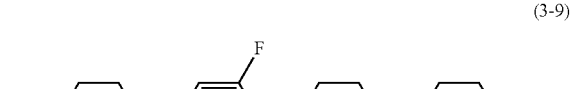

-continued

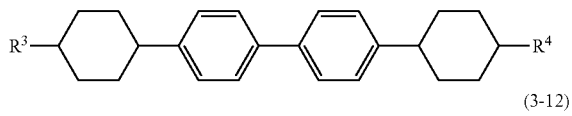
(3-11)

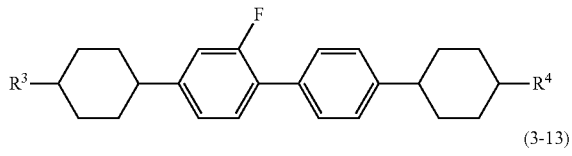
(3-12)

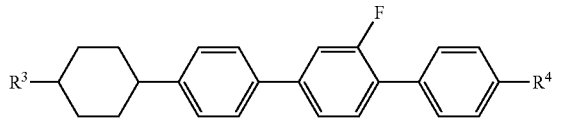
(3-13)

wherein $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine.

12. The liquid crystal composition according to claim 10, wherein a ratio of the second component is in a range of 10 wt % to 80 wt % and a ratio of the third component is in a range of 20 wt % to 90 wt % based on a weight of the liquid crystal composition excluding any polymerizable compound that is or is not the first component, and a ratio of the polymerizable compound that is or is not the first component is in a range of 0.03 part by weight to 10 parts by weight based on 100 parts by weight of the liquid crystal composition excluding the polymerizable compound that is or is not the first component.

13. The liquid crystal composition according to claim 1, further including a polymerization initiator.

14. The liquid crystal composition according to claim 1, further including a polymerization inhibitor.

15. The liquid crystal composition according to claim 1, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.

16. A polymer sustained alignment (PSA) type liquid crystal display device, characterized by that the device includes two substrates where at least one of the substrates has an electrode layer, and by that a liquid crystal material, which includes a polymer formed by polymerization of the polymerizable compound in the liquid crystal composition according to claim 1, is arranged between the two substrates.

17. The liquid crystal display device according to claim 16, wherein an operating mode of the liquid crystal display device is a TN mode, a VA mode, an OCB mode, an IPS mode or an FFS mode, and a driving mode of the liquid crystal display device is an active matrix mode.

18. A method for producing a liquid crystal display device, wherein the liquid crystal display device according to claim 17 is produced by steps comprising: light-irradiating the liquid crystal composition arranged between the two substrates to polymerize the polymerizable compound, while a voltage is applied.

* * * * *